United States Patent
Agutter et al.

(10) Patent No.: US 7,593,013 B2
(45) Date of Patent: Sep. 22, 2009

(54) SYSTEMS AND METHODS FOR DISPLAYING AND QUERYING HETEROGENEOUS SETS OF DATA

(75) Inventors: James Agutter, Salt Lake City, UT (US); Stefano Foresti, Salt Lake City, UT (US); Shaun Moon, Salt Lake City, UT (US); Julio Bermudez, Salt Lake City, UT (US); Yarden Livnat, Salt Lake City, UT (US); Thomas Morahan, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 349 days.

(21) Appl. No.: 11/373,085

(22) Filed: Mar. 9, 2006

(65) Prior Publication Data
US 2007/0188494 A1    Aug. 16, 2007

Related U.S. Application Data

(60) Provisional application No. 60/661,074, filed on Mar. 11, 2005.

(51) Int. Cl.
*G06T 11/20* (2006.01)

(52) U.S. Cl. .............. 345/440; 345/440.1; 345/440.2; 345/581; 715/734; 715/763; 715/771; 715/811; 715/839; 715/861

(58) Field of Classification Search .......... None
See application file for complete search history.

(56) References Cited

U.S. PATENT DOCUMENTS

| | | | | |
|---|---|---|---|---|
| 6,088,030 A * | 7/2000 | Bertram et al. | ............. | 715/839 |
| 7,202,868 B2 * | 4/2007 | Hao et al. | ................... | 345/440 |
| 7,290,212 B2 * | 10/2007 | Fushimi et al. | ............. | 715/731 |
| 7,408,554 B2 * | 8/2008 | Lawson et al. | ............. | 345/442 |
| 2004/0164983 A1 * | 8/2004 | Khozai | ..................... | 345/440 |
| 2006/0048064 A1 * | 3/2006 | Vronay | ...................... | 715/764 |

* cited by examiner

*Primary Examiner*—Antonio A Caschera
(74) *Attorney, Agent, or Firm*—Fenwick & West LLP

(57) ABSTRACT

A visualization system for heterogeneous data sets comprises: a unique visualization interface created by a visualization engine. The visualization interface comprises a first area defining a center of attention, second area defining a parameter space and a plurality of correlation elements. The first area is a two-dimensional space for the display of items of interest. The second area provides a space in which parameters associated with the items of interest can be displayed. The correlation elements indicate relationships and their strength between items of interest and parameters in the second area. The visualization engine preferably comprises an input module, a control module, a retrieving module, a rendering module, and an analysis module. These components are coupled together to receive input from a user, retrieve data from a data source, and present the unique visualization interface to the user.

6 Claims, 23 Drawing Sheets
(9 of 23 Drawing Sheet(s) Filed in Color)

Figure 20

SYSTEMS AND METHODS FOR DISPLAYING AND QUERYING HETEROGENEOUS SETS OF DATA

CROSS-REFERENCES TO RELATED APPLICATIONS

The present application claims priority under 35 U.S.C. § 119(e) to U.S. Provisional Patent Application No. 60/661,074, filed on Mar. 11, 2005, entitled "SYSTEM AND METHOD FOR AN INTRUSION DETECTION SYSTEM" which is incorporated by reference in its entirety.

STATEMENT REGARDING FEDERALLY SPONSORED RESEARCH OR DEVELOPMENT

This invention was made with government support under Grant No. F30602-03-C-0257 awarded by the United States Air Force. The Government has certain rights to this invention.

BACKGROUND OF THE INVENTION

1. Field of the Invention

The present invention relates to systems and methods for displaying and providing user interaction with heterogeneous sets of data. In particular, the present invention relates to systems and methods that provide a novel graphical user interface that allows the user to focus on data of interest. More specifically, the present invention relates to systems and methods for displaying the user interface that includes: a center of attention, a parameter space, and a plurality of correlations between the center of attention and the parameter space.

2. Description of the Background Art

With the use and proliferation of computers, the Internet, and devices that collect digital data, there has been an explosion in the amount of data available in addition to the number of types of data that are available. This data is often available to the user only in particular applications. These massive quantities of data often have proprietary or specific formats and custom user interfaces to access them. While there are some mechanisms to import or reformat data so that it is usable in another system, there are not systems and methods that allow users to view heterogeneous sets of data in an effective and efficient manner. Furthermore, since there is so much data, systems for interacting and displaying data are often not able to appropriately represent the data or focused the user's attention on the portions of data that are most significant. Thus there is a need for new and improved user interface that allows such capabilities.

One example of an area that produces great amount of data and that need systems and methods for representation and visualization of that data is cyber security. Cyber security has become increasingly important due to the dependence of our modern day society on computerized information systems. Billions of bytes of data are transported across computer networks everyday, carrying information about credit transactions, banking information, sensitive government information, power plant operations, and personal notes. The pervasiveness of sensitive information makes it increasingly vulnerable to malicious uses and exploits. It is important that electronic communication transfers are secure and reliable in a society that depends so heavily on information networks. One way to increase the overall security of computer networks is to develop tools that increase the situational awareness and understanding of all those responsible for their safe operations.

Making quick and accurate decisions in complex and rapidly changing environments is a major concern in many fields, including patient monitoring, computer network management, financial trading, process control, government intelligence, vehicle operation, traffic control, enterprise systems management, corporate management, and quality assurance.

Given a natural or man-made system, events occur that need to be detected, diagnosed, and treated in order to maintain or improve the "health" of such a system (health being defined as normal or desired behavior). Using all the raw data that may be measured or computed, insight is achieved by identifying the functional relationships among data variables. In addition, a decision maker has a specific context, mission and expertise, and may want to know: the overall health of the system versus the component details, exact quantities of variables versus the qualitative behavior of variables (or their relationships), and the history and trend versus the details of the moment.

The prior art presents streams of abstract data (e.g. heart rate, stock price, packet loss) with plots, pies, bars, maps, trees, etc. Displays based on these centuries' old metaphors do not reflect the relative importance of the variables and the evolution of the relationships. In addition, chart type displays do not capitalize on the power of modern computer graphics and on human natural perception. Such displays also have a limited ability to convey insight from the increasing amount of data produced today.

Sifting through and integrating many screens of such output displays to determine functional relationships reliably may produce information overload for an analyst. Cognitive psychologists have demonstrated that humans are capable of processing no more than four interacting variables at a time unless the individual has developed high levels of expertise in understanding data in that particular domain. When faced with multi-variant information, decision makers develop their own heuristic rules and mental models for selecting and integrating information, which may take years of training or experience. In other situations, decision makers need intermediation by experts. This additional analysis introduces layers of reliability loss and time delay, which interfere with mission criticality. There is a need for tools that augment human ability to draw insight from abundant or complex data, in order to make decisions faster, more accurately, with less cognitive effort, and less training.

Research in information visualization and software development has primarily focused more on the internal processing logic and data organization, and less on methods to present data in a usable way so that others make better decisions. Little literature is available on real time decision making. Research in information visualization often consists of improving traditional visual metaphors. However, many existing visual metaphors and techniques may not be intuitive to inexperienced users. For example, most prior art representations do not satisfy the principles of congruence (internal data representation needs to be consistent with the external representation) and apprehension (the representation needs to be intuitively apprehended).

Computer scientists, who may not be trained in visual communication or in user knowledge elicitation, usually design information visualizations. As a result, the user's interaction and apprehension have been left as a secondary issue. Many believe that usability must be employed throughout the development process. User-centered design methodologies have emerged and are being utilized for software development such as Hartson and Hix star life cycle and the adopted ISO 13407 standards.

However, few information visualization solutions have involved user-centered approaches, despite usability being critical for effective transfer and understanding of information. The focus on data presentation requires user interaction. This differs from expert systems, which typically represent experts' heuristics as data or rules, and generally does not involve the user in exploratory data analysis using human pre-attentive perceptual skills.

Typical examples of current techniques include spreadsheets, basic histograms and bar charts (Flowscan), node and link metaphors (NIVA), scatter plots (NVision), line-position, and star coordinates. Fundamentally, the prior art techniques are: 1) based on simple representations, 2) do not map effectively to the visual processes and more importantly to the decision making process, 3) focus on very narrow or trivial problems or data sets, or 4) are designed by analysts for personal use on specific tasks.

Flexview is an AFRL visualization tool based on spreadsheets that represents snort alerts in tabular form. An expert analyst can initiate queries and filters to identify anomalous activity represented within the snort alerts. While it is an effective way to filter the alerts, it does not present the information graphically and does not allow the ability to include other types of alerts and data.

Other techniques use simple histograms and bar charts to indicate a relative value of network health or activity. Sudden changes in behavior of the overall network are an indicator of anomalous network activity. However, many of these representations offer only limited representation and analysis capabilities.

Scatter plots have become extremely popular, especially in the representation of port activity (PortVis). This visualization technique has merits in its ability to see port scan activity which may be a precursor to an attack but this only represents a very narrow view of the problem and in the current implemented form does not allow for the integration of multiple data sets. This limits the ability to see complex relationships among disparate data sets.

Many node and line or line-position based techniques have been developed. However, many of these are poorly designed resulting in cluttered and confusing displays with limited information. Often times these displays have an enormous number of lines intersecting and shown with no way to see relationships and hierarchy of the importance of the information. Many of these techniques have gained interest due to the publication of promising results. However, these results are based on trivial data sets, such as the representation of BGP data. For example, one visualization technique aids the detection of a worm virus, however a simple histogram may have been a more effective visualization for such data.

Therefore, what are needed are systems and methods for displaying and providing user interaction with heterogeneous sets of data.

SUMMARY OF THE INVENTION

The present invention overcomes the deficiencies and limitations of the prior art by providing a visualization system for heterogeneous data sets. In one embodiment, visualization system comprises: a unique visualization interface created by a visualization engine. The visualization interface preferably comprises a window or canvas having a first area defining a center of attention, second area defining a parameter space and a plurality of correlation elements. The first area provides a center of attention or center of interest, which in one embodiment provides a two-dimensional space for the display of objects or items of interest. The second area provides a space in which parameters associated with the objects of interest can be displayed. Finally, the correlation elements indicate relationships and their strength between objects of interest and parameters in the second area. The visualization engine creates the unique visualization interface and is coupled to a data source, such as a database. The visualization engine preferably comprises an input module, a control module, a retrieving module, a rendering module, and an analysis module. These components are coupled together to receive input from the user, present the unique visualization interface to the user, and retrieve data from the data source. In one embodiment, the control module is also coupled to receive alerts or warning signals identifying particular conditions. Responsive to the receipt of such alerts or warning signals, the control module automatically modifies and updates the visualization interface and displayed interface to the user.

The present invention also includes a number of novel methods including: a method for creating visualization interface, a method for updating the visualization interface, and a method for modifying the visualization interface responsive to an alert.

BRIEF DESCRIPTION OF THE DRAWINGS

The file of this patent or application contains at least one drawing executed in color. Copies of this patent or patent application publication with color drawings will be provided by the USPTO upon request and payment of the necessary fee. The invention is illustrated by way of example, and not by way of limitation in the figures of the accompanying drawings in which like reference numerals are used to refer to similar elements.

FIG. 20 is a graphical representation of an application for first embodiment of the visualization interface of the present invention to biological sensor monitoring.

DETAILED DESCRIPTION OF THE PREFERRED EMBODIMENTS

Figure 1:
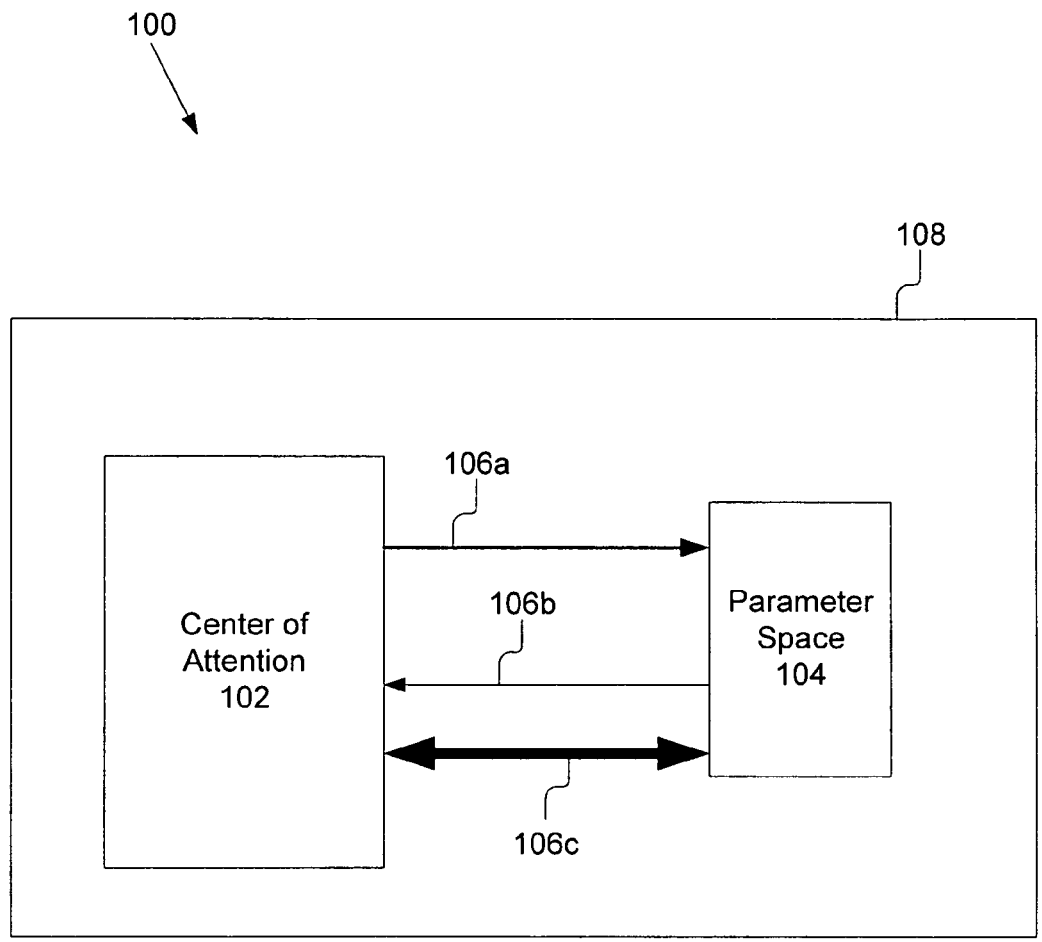
FIG. 1 is a conceptual block diagram of an embodiment of a visualization user interface in accordance with the present invention.

Systems and methods for displaying a visualization interface and providing user interaction with heterogeneous sets of data are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described primarily with reference to network security and a number of other examples will be given. However, the present invention applies to any systems that have a need to present and interact with multiple data sets of different types such as but not limited to financial data, medical data, technical data, environmental data, research data, etc.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Moreover, the present invention claimed below is operating on or working in conjunction with an information system or network. For example, the invention can operate on a stand-alone computing device or a networked computing device with functionality varying depending on the configuration. Thus, the present invention is capable of operating with any information system from those with minimal functionality to those providing all the functionality disclosed herein.

Conceptual Overview

Referring now to FIG. 1, a conceptual block diagram of an embodiment for a visualization user interface for heterogeneous data sets in accordance with the present invention is shown. The present invention is particularly advantageous because it provides a visualization user interface 100 that solves the problems noted above with the prior art. In particular, the visualization user interface 100 ensures that objects of interest are highlighted and their correlation to parameters is shown in a visually distinct manner. The visualization user interface 100 displays the center of attention, the parameter space, and the correlation elements in a visually distinct manner, individually or collectively to focus the user's attention on particular situations that may be problematic or deserving of additional analysis or attention. Furthermore, the visualization user interface 100 allows the user to interact with the display such that any objects in the center of attention, parameters and the parameter space, or correlation elements may be selected by the user and the display is updated to present information particular to the object selected. The visualization user interface 100 is generated by a visualization system 200 (described below).

The visualization user interface 100 of FIG. 1 shows the simplest embodiment of the present invention so that the concepts of the present invention can be explained without being obscured. The visualization user interface 100 preferably comprises: a window or canvas 108 having a first area defining a center of attention 102, a second area defining a parameter space 104 and a plurality of correlation elements 106a-c. The first area 102 provides a center of attention or center of interest, which in one embodiment provides a two-dimensional space for the display of objects of interest. In this embodiment, the first area 102 is a rectangular area of variable size, positioned proximate the center of the display. The second area 104 provides a space in which parameters associated with the objects in the center of attention 102 can be displayed. In this embodiment, the second area 104 is a rectangular area of variable size positioned proximate the first area 102. The correlation elements 106a-c show relationships and their strength between objects in the center of attention 102 and parameters in the parameter space 104. In this embodiment, the correlation elements 106a-c are each depicted as a line with directional ends and/or variable line thickness to convey to the user the strength of correlation and the type of correlation. Those skilled in the art will recognize that the shapes, sizes, colors and elements are used only by way of example and that various other graphical elements might be used in place of those given with reference to FIG. 1.

Figure 2:
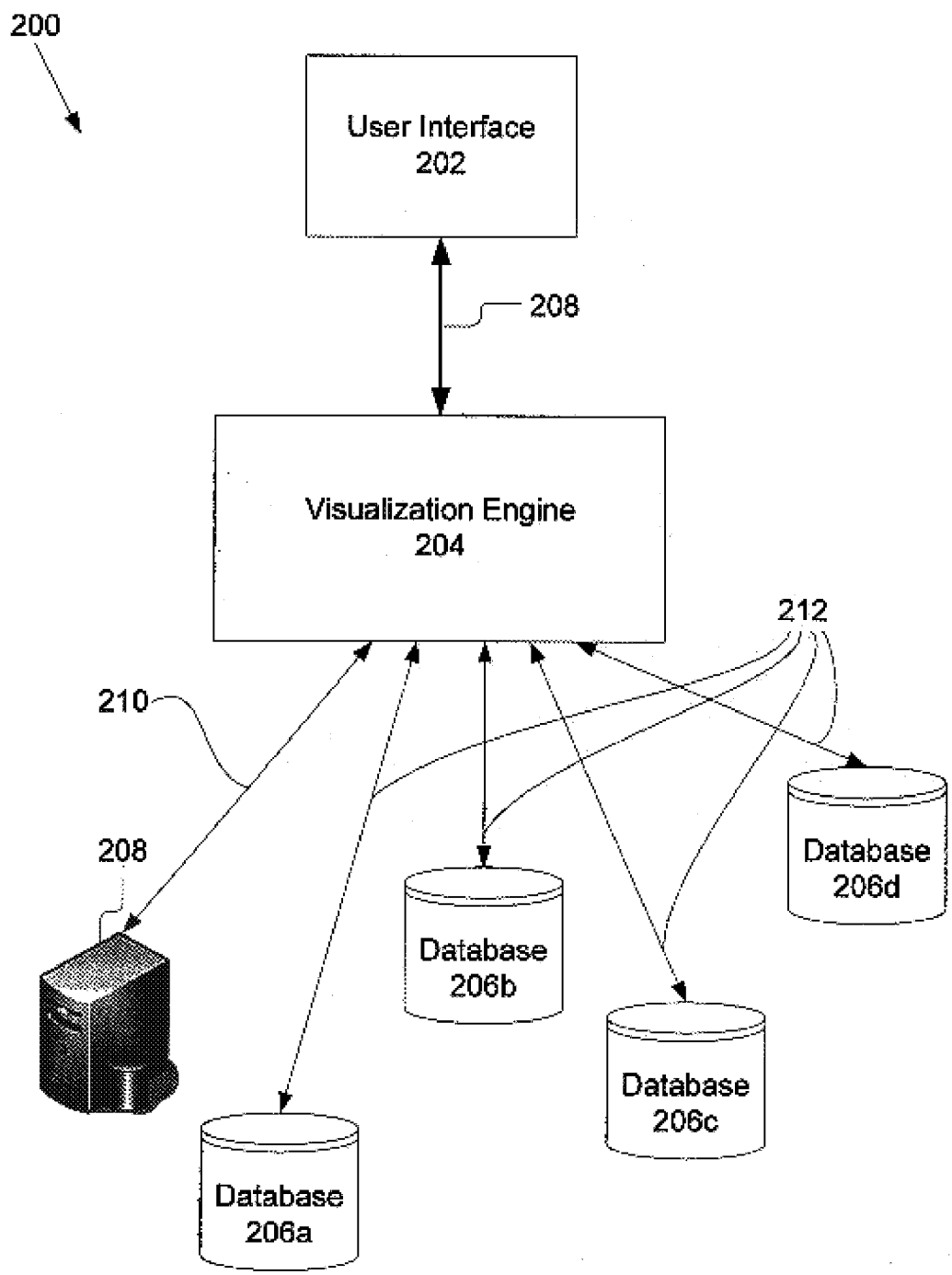
FIG. 2 is a block diagram of a first embodiment of a visualization system of the present invention.

Referring now to FIG. 2, a first embodiment of a visualization system 200 of the present invention is shown. In this first embodiment, the system 200 comprises: a user interface 202, a visualization engine 204 and at least one data source, such as a database server 208 or a database 206a-d. The user interface 202 provides a display as has been described above with reference to FIG. 1. The user interface 202 allows the user to view data in accordance with the present invention, as well as implement control signals and interact with the presentation of the data. The user interface 202 is coupled by signal line 214 to a visualization engine 204. The visualization engine 204 generates the user interface 202. The visualization engine 204 also receives input from the user via the user interface 202. The visualization engine 204 is also coupled via signal line 210 to the database server 208. The database server 208 can provide data that is used by the visualization engine 204 to generate the user interface 202. The database server 208 also provides alert or warning signals that are used by the visualization engine 204 has triggers to initiate a process of updating or regenerating the user interface 202 to take into consideration new information. The primary possibility of visualization engine 204 used to retrieve data from the database server 208 or another data source such as the databases 206a-d. The visualization engine 204 is communicatively coupled to the databases 206a-d by signal lines 212. The databases 206a-d are of a conventional type and store information about the objects in the center of attention 102, information about the parameters in the parameter space 104 and other information from which correlation elements 106a-c can be generated. In order to generate the user interface 202, the visualization engine 204 performs calculations and analysis on data received from the databases 206a-d. Furthermore, the visualization engine 204 has the capability to query the database 206a-d to retrieve the data necessary for these calculations and analysis.

Figure 3:
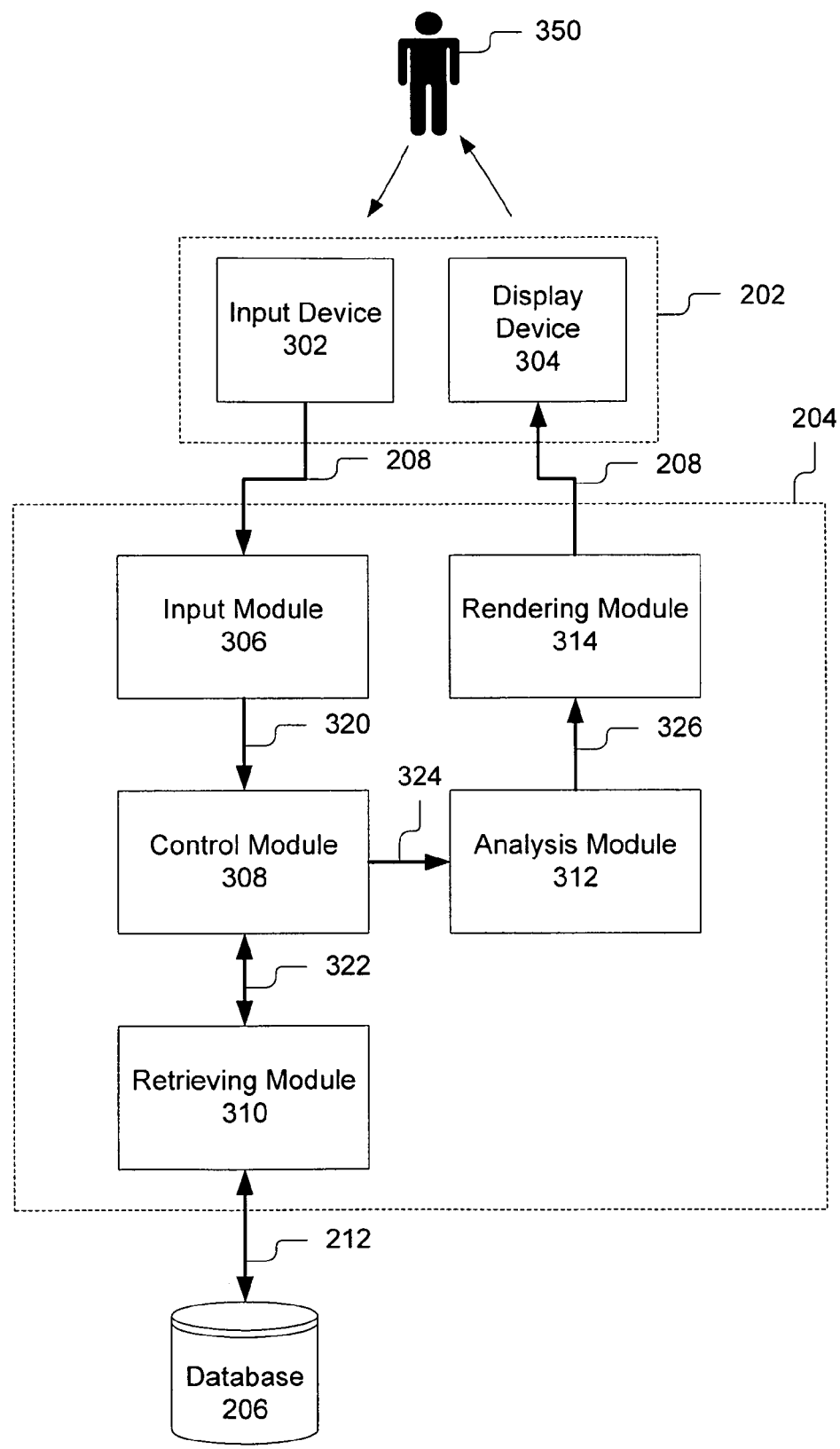
FIG. 3 is a block diagram of the visualization system of the present invention showing the user interface and visualization engine in more detail.

Referring now to FIG. 3, the user interface 202 and the visualization engine 204 will be described in more detail. The user interface 202 comprises an input device 302 and a display device 304. The input device 302 and the display device 304 are of conventional types as will be described below with reference to FIG. 4. The input device 302 allows a user 350 to input selections and commands. The display device 304 is under the control of the visualization engine 204 for the display of the visualization user interface 100. Respective signal lines 214 couple the visualization engine 204 to the input device 302 and the display device 304.

The visualization engine 204 further comprises an input module 306, a control module 308, a retrieving module 310, an analysis module 312, and a rendering module 314. The control module 308 controls the operation of the visualization engine 204 generally as will be described below with reference to FIGS. 6-8. More particularly, the control module 308 is coupled to and controls the input module 306, the retrieving module 310, the analysis module 312, and the rendering module 314.

The input module 306 has an input coupled signal line 214 to receive input from the enclosed device 302. The input module 306 receives and stores input commands from the user and translates them into signals usable by the control module 308. The output of the input module 306 is coupled by signal line 320 in the input of the control module 308.

The retrieving module 310 has a port that is coupled by signal line 212 to the database 206. Although only a single database 206 is shown as being coupled to the receiving module 310, those skilled in the art will recognize that the receiving module 310 may be coupled to any number of databases 206 or database servers 208. The retrieving module 310 is responsible for retrieving data that can be provided to the analysis module 312. The retrieving module 310 is coupled by signal line 322 to the control module 308 to receive and send data and instructions to and from the control module 308. Although not shown in FIG. 3, the receiving module 310 may also be coupled to a variety of other systems (not shown) to receive data and alert or warning signals that may prompt the control module 308 to regenerate the visualization user interface 100.

The analysis module 312 is coupled by signal line 324 to the control module 308 and by signal line 326 to the rendering module 314. Responsive to signals received from the control module 308, the analysis module 312 processes data from the receiving module 310. The analysis module 312 generates the data for the objects of interest for the center of attention 102, the parameters for the parameter space 104, and the correlation elements and their weightings. These elements of the visualization user interface 100 including their values are provided at the output of the analysis module 312 to the rendering module 314. A specific example of analysis undertaken and performed by the analysis model 312 for the network security is described below, with reference to FIGS. 14-16.

The rendering module 314 uses the output of the analysis module 312 provided on signal line 326 to produce the graphical elements that form the visualization user interface 100. Once generated these elements are provided on signal line 214 for display on the display device 304. The rendering module 314 translates the data from the analysis module 312 into specific graphical elements depending on the specific user interface design. Examples of such graphical elements for data from the analysis module 312 are described below with reference to FIGS. 9A-13.

Figure 4:
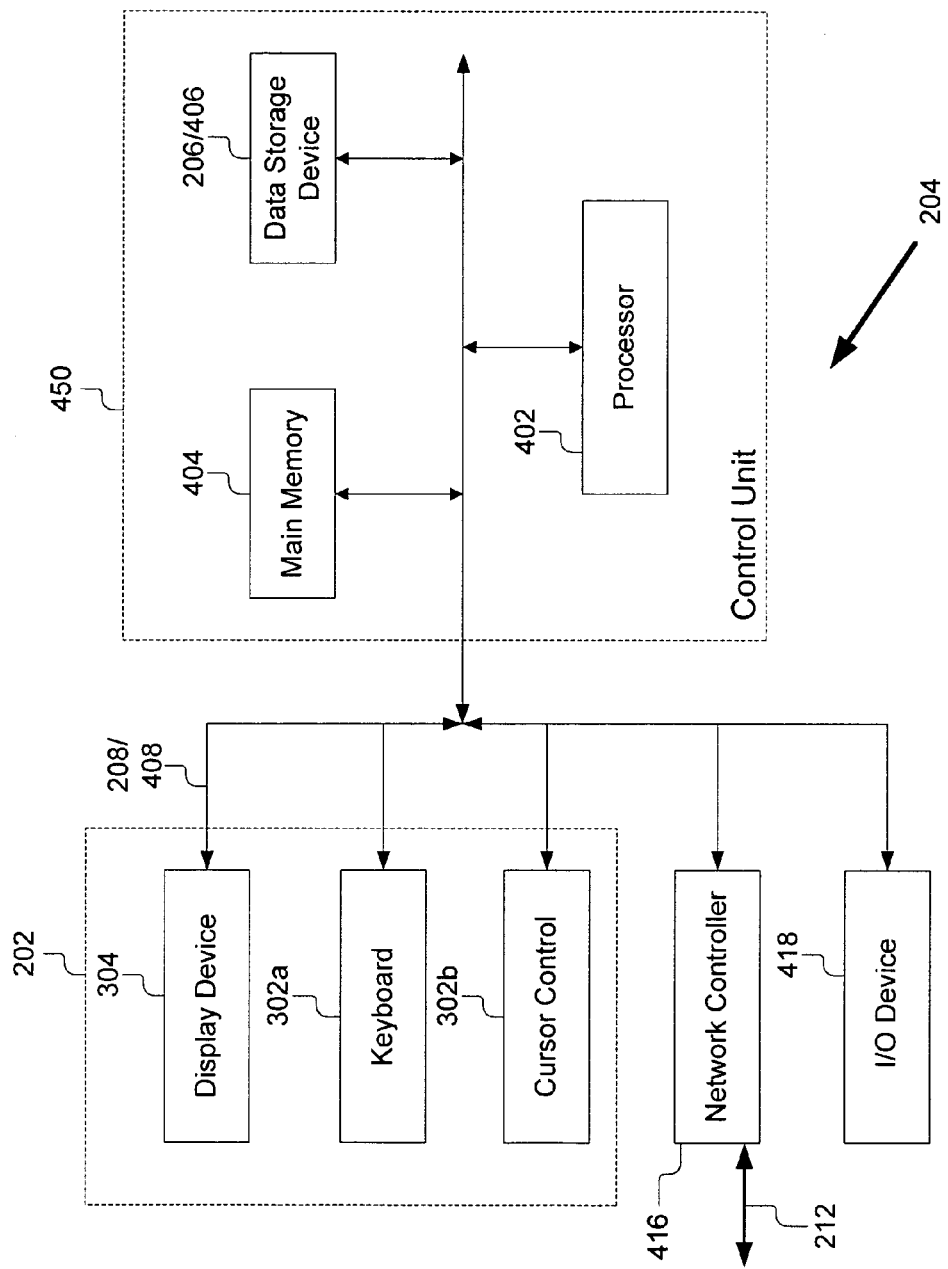
FIG. 4 is a block diagram of another embodiment of the visualization engine in accordance with the present invention.

FIG. 4 is a block diagram of another embodiment of visualization engine 204 in accordance with the present invention. The visualization engine 204 preferably comprises a control unit 450, the display device 304, a keyboard 302a, a cursor control device 302b, a network controller 416 and one or more input/output (I/O) device(s) 418.

Control unit 450 may comprise an arithmetic logic unit, a microprocessor, a general purpose computer, a personal digital assistant or some other information appliance equipped to provide electronic display signals to display device 304. In one embodiment, control unit 450 comprises a general purpose computer having a graphical user interface, which may be generated by, for example, a program written in Java running on top of an operating system like WINDOWS® or UNIX® based operating systems. In one embodiment, one or more application programs are executed by control unit 450 including, without limitation, word processing applications, electronic mail applications, financial applications, and web browser applications.

Still referring to FIG. 4, the control unit 450 is shown including processor 402, main memory 404, and data storage device 206/406, all of which are communicatively coupled to system bus 408.

Processor 402 processes data signals and may comprise various computing architectures including a complex instruction set computer (CISC) architecture, a reduced instruction set computer (RISC) architecture, or an architecture implementing a combination of instruction sets. Although only a single processor is shown in FIG. 4, multiple processors may be included.

Main memory 404 stores instructions and/or data that may be executed by processor 402. The instructions and/or data may comprise code for performing any and/or all of the techniques described herein. Main memory 404 may be a dynamic random access memory (DRAM) device, a static random access memory (SRAM) device, or some other memory device known in the art. The memory 404 is described in more detail below with reference to FIG. 5.

Data storage device 206/406 stores data and instructions for processor 402 and comprises one or more devices including a hard disk drive, a floppy disk drive, a CD-ROM device, a DVD-ROM device, a DVD-RAM device, a DVD-RW device, a flash memory device, or some other mass storage device known in the art.

System bus 408 represents a shared bus for communicating information and data throughout control unit 450. System bus 408 may represent one or more buses including an industry standard architecture (ISA) bus, a peripheral component interconnect (PCI) bus, a universal serial bus (USB), or some other bus known in the art to provide similar functionality. Additional components coupled to control unit 450 through system bus 408 include the display device 304, the keyboard 302a, the cursor control device 302b, the network controller 416 and the 110 device(s) 418.

Display device 304 represents any device equipped to display electronic images and data as described herein. Display device 304 may be, for example, a cathode ray tube (CRT), liquid crystal display (LCD), or any other similarly equipped display device, screen, or monitor. In one embodiment, display device 304 is equipped with a touch screen in which a touch-sensitive, transparent panel covers the screen of display device 304.

Keyboard 302a represents an alphanumeric input device coupled to control unit 450 to communicate information and command selections to processor 402. The keyboard 302a can be a QWERTY keyboard, a keypad, or representations of such created on a touch screen.

Cursor control 302b represents a user input device equipped to communicate positional data as well as command selections to processor 402. Cursor control 302b may include a mouse, a trackball, a stylus, a pen, a touch screen, cursor direction keys, or other mechanisms to cause movement of a cursor.

Network controller 416 links control unit 450 to a network that may include multiple processing systems. The network of processing systems may comprise a local area network (LAN), a wide area network (WAN) (e.g., the Internet), and/or any other interconnected data path across which multiple devices may communicate. The control unit 450 also has other conventional connections to other systems such as a network for distribution of files (media objects) using standard network protocols such as TCP/IP, http, https, and SMTP as will be understood to those skilled in the art.

One or more I/O devices 418 are coupled to the system bus 408. For example, the I/O device 418 includes an image scanner and document feeder for capturing an image of a document. The I/O device 418 also includes a printer for generating documents. The I/O device 418 may also include audio input/output device equipped to receive audio input via a microphone and transmit audio output via speakers. In one embodiment, audio device is a general purpose; audio add-in/expansion card designed for use within a general purpose computer system. Optionally, I/O audio device may contain one or more analog-to-digital or digital-to-analog converters, and/or one or more digital signal processors to facilitate audio processing.

It should be apparent to one skilled in the art that visualization engine 204 may include more or less components than those shown in FIG. 4 without departing from the spirit and scope of the present invention. For example, visualization engine 204 may include additional memory, such as, for example, a first or second level cache, or one or more application specific integrated circuits (ASICs). Similarly, additional components input/output devices 418 may be coupled to control unit 450 including, for example, an RFID tag reader, digital still or video cameras, or other devices that may or may not be equipped to capture and/or download electronic data to control unit 450. One or more components could also be eliminated such as I/O device 418.

Figure 5:
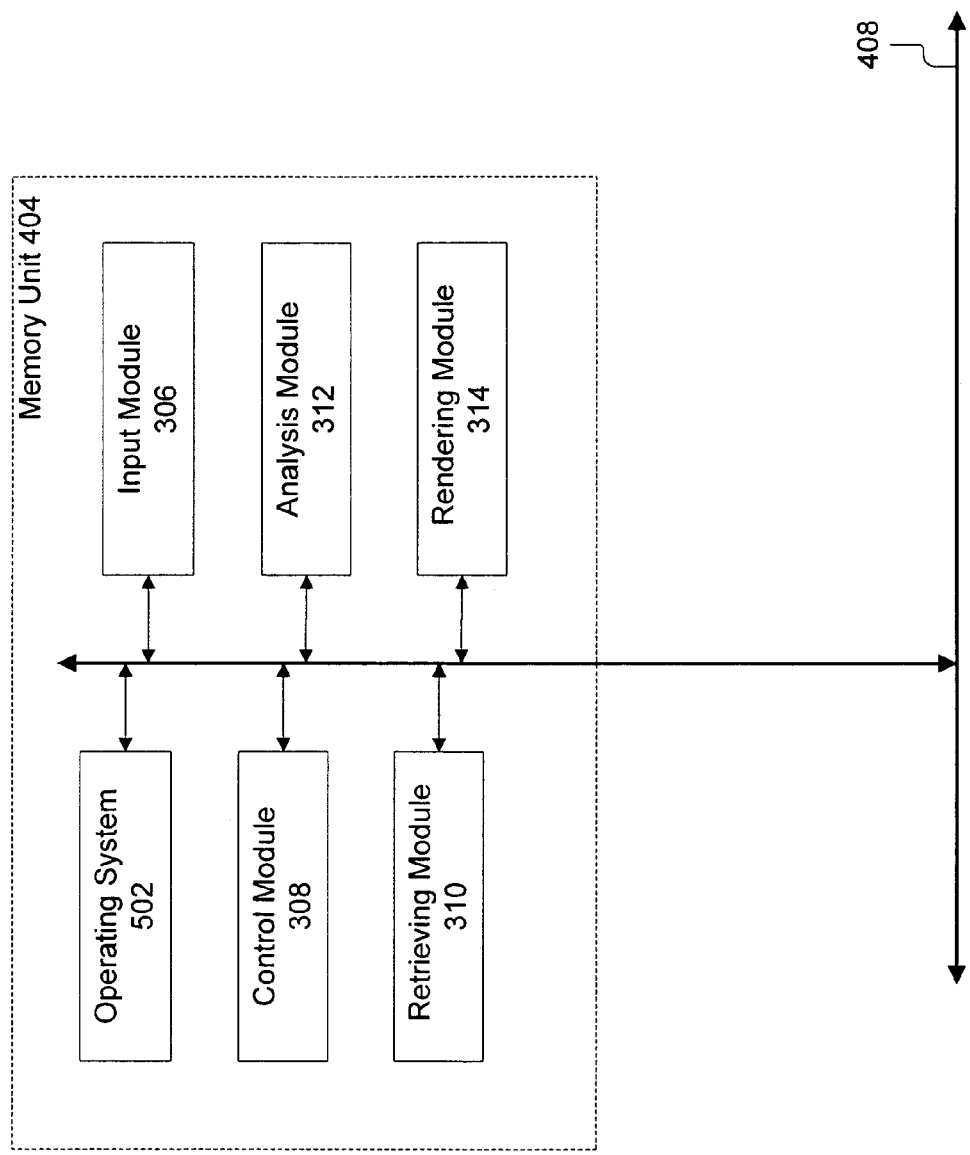
FIG. 5 is a block diagram of an embodiment of the memory for the visualization engine.

FIG. 5 is a block diagram of one embodiment of the memory unit 404 for the visualization engine 204. The memory unit 404 for the visualization in 204 preferably comprises: an operating system 502, the input module 306, the control module 308, the retrieving module 310, the analysis module 312, and the rendering module 314. As noted above, the memory unit 404 stores instructions and/or data that may be executed by processor 402. The instructions and/or data may comprise code for performing any and/or all of the techniques described herein. These modules 502, 306, 308, 310, 312, 314 are coupled by bus 408 to the processor 402 for communication and cooperation to provide the visualization system 200. Those skilled in the art will recognized that while the present invention will now be described as modules or portions of a memory unit 404 of a computer system, the modules or portions may also be stored in other media such as permanent data storage device 206/406 and may be distributed across a network having a plurality of different computers such as in a client/server environment. The operating system 502 is preferably one of a conventional type such as, WINDOWS®, SOLARIS® or LiNUX® based operating systems. Although not shown, the memory unit 404 may also include one or more application programs including, without limitation, word processing applications, electronic mail applications, financial applications, and web browser applications. The input module 306, the control module 308, the retrieving module 310, the analysis module 312, and the rendering module 314 provide the same functionality has been described above, but are modules or routines that are operable on general purpose computer.

Figure 17:
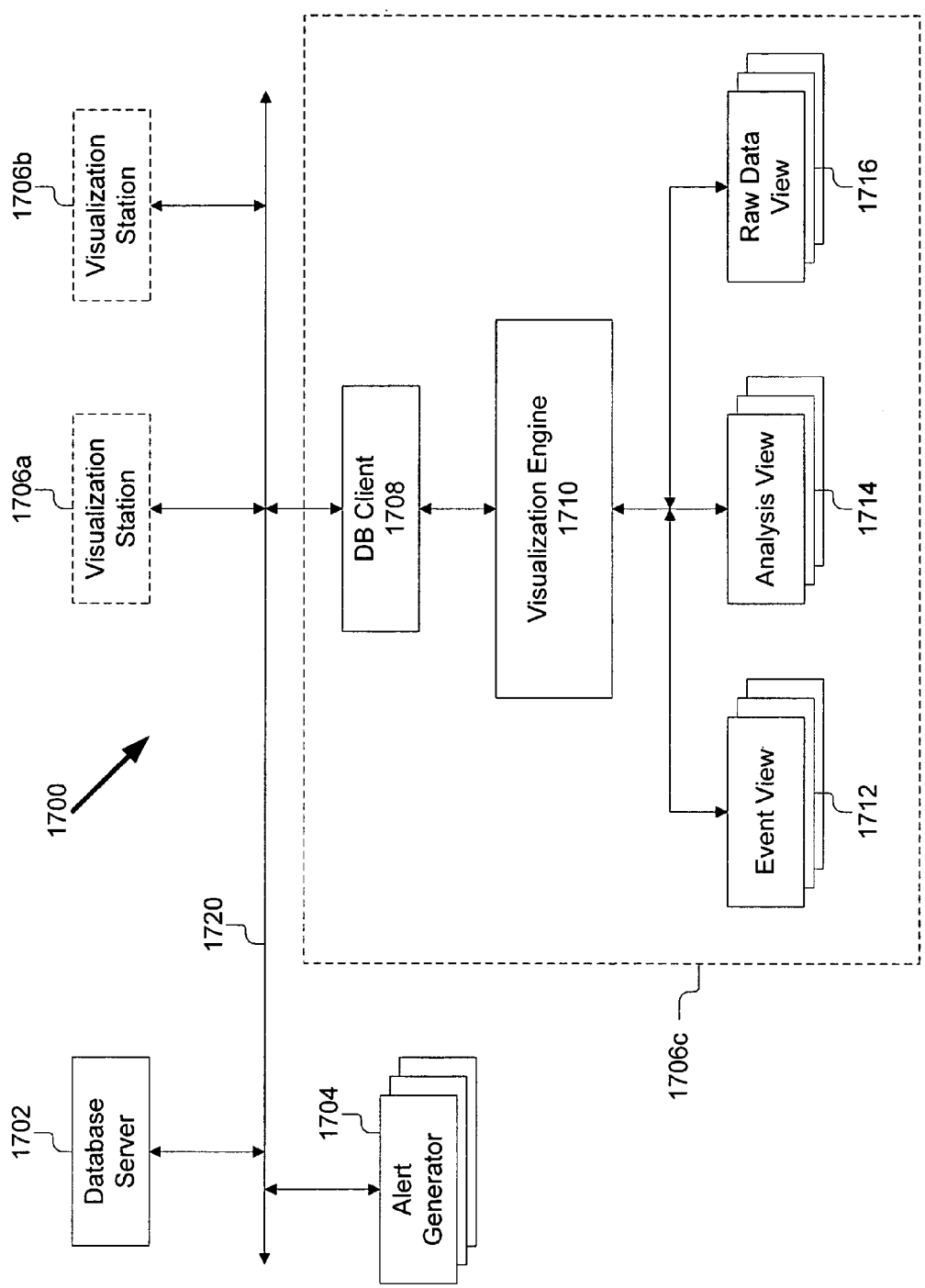
FIG. 17 is a block diagram of a second embodiment of a visualization system of the present invention.

Referring now to FIG. 17, a second embodiment of a visualization system 1700 of the present invention will be described. The visualization system 1700 comprises a database server 1702, at least one alert generator 1704, and at least one visualization station 1706. The preferred and implementation of this second embodiment 1700 includes a plurality of alert generators 1704 and a plurality of visualization stations 1706a and 1706b. The database server 1702 is a conventional type and stores data for display on the visualization station 1706. The alert generator 1704 can be any one of various systems that provide output signals in the form of alerts or warning signals indicating certain conditions. In addition to the notification signal of a particular condition or event, the alert generator 1704 provides other information typically associated with the notification signal.

The visualization station 1706 preferably includes a database client 1708, a visualization engine 1710, an event view 1712, an analysis view 1714 and a raw data view 1716. The database client 1708 is a client that enables communication between the visualization station 1706 and the database server 1702. The visualization engine 1710 has the same functionality as has described above with reference to FIGS. 3 and 5.

The event view 1712 uses different routines for generating the views as have or will be described with reference to FIGS. 1, 9A-16 and 18A-20. More specifically, the events view 1712 relies on the center of attention paradigm for presenting the data to the user with one key aspect being to focus the user's attention on the appropriate aspects of changes in information state.

The analysis view 1714 uses different routines for generating the analysis views. The analysis view 1714 provides the user with the ability to assign a multitude of variables such as flow data, snort alerts tripped, ftp alerts tripped to graphic properties of objects such as x,y dimensions, color, size, and brightness. This allows the user to quickly test hypothesis and compare different types of data across a larger time span. The analysis view 1714 in one embodiment includes a scatter plot tool that illuminates relationships between different fields of interest and is scalable and focuses on the temporal aspect of the data.

In addition to the configurable variable mappings of the scatter plot, the display is an interface for filtering through the data by ranges or by individual values in a particular field. For example, an analyst could turn off any activity associated to a particular destination port, whether or not destination port is mapped into the current view. The inverse is also supported, for instance if an analyst is interested in activity from a domain that may be malignant to a particular destination port, the analyst can turn off any activity to the determined port as well as any activity coming from the specific range of source IP addresses.

This visual Boolean interaction allows an analyst to look for or analyze network data that may be correlated to any level of network intrusion. This tool can also be applied to machine specific data that may reflect intrusion or compromise, either independently or in connection with the network based data. The tool also supports the overlay of particular alerts (Snort, Firewall, windows events, etc. . . . ) with network flow data so that an analyst can correlate disparate data sets over time.

Figure 16:
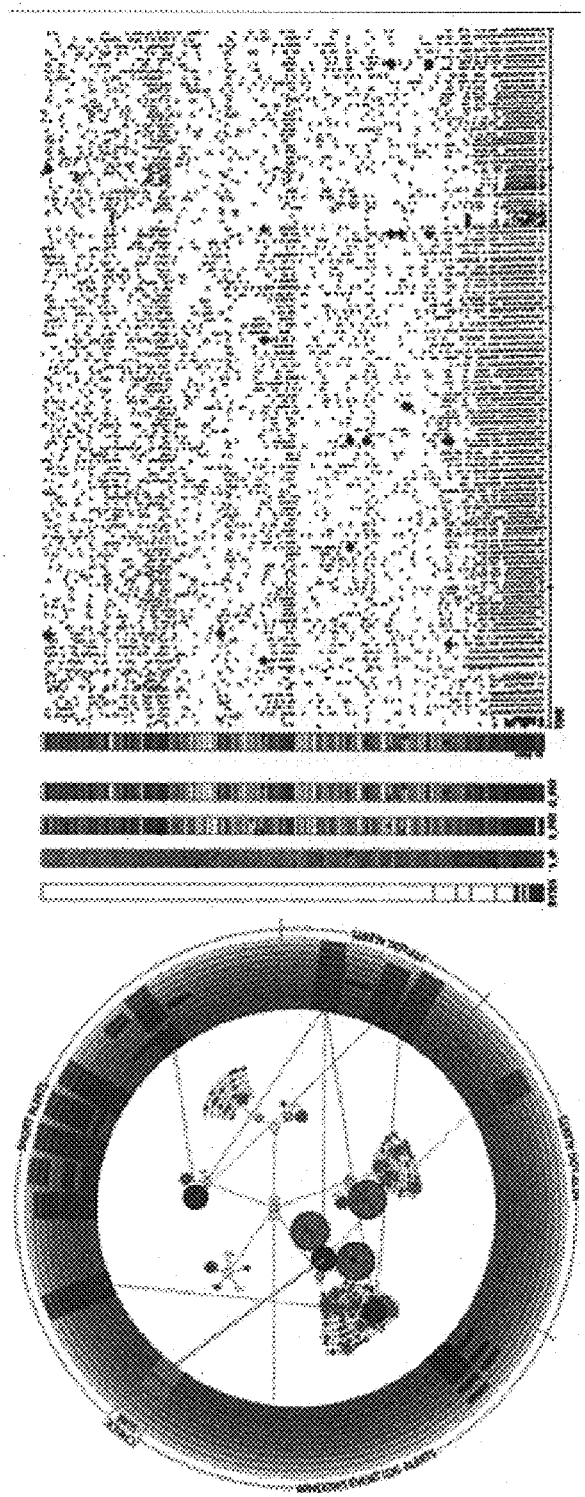
FIG. 16 is a graphical representation of the sixth embodiment of the visualization user interface of the present invention combined with other user interfaces.

To integrate these two data type visualizations, the present invention includes a waterfall that displays a collection of hybrid histogram and status bars that display raw net flow data in a user configured summarized time span which is restricted to the IP range displayed or selected in the topology map. In addition to showing a summary of the flow variables, the display allows for the overlay of alerts associated with the topology map so that complex attacks can be seen. The waterfall histogram variable bars can be expanded to reveal the scatter plot view showing on the vertical axis the data related to the bar and on the horizontal axis the time range of the sample. An example is shown in FIG. 16. This shows the analyst any trends or patterns in the raw data. Seeing these patterns helps an analyst identify false positives and negatives from the algorithmically refined alert logs.

To integrate expert knowledge from the analysts into the visualizations, the present invention associates comments and interpretation to patterns, events or views within the visualization. For example in the topology based tool, a user can associate a note to the rules and logs so that other individuals viewing the data can see what the analyst thought about a particular node or area of interest. In another example, an analyst could associate a note explaining that a scatter plot pattern overlaid with alert halos shows a pattern in where malicious activity has been seen across a particular IP range. These analyst observations and commentary would be integrated in the visualization as a flag icon linked to the relevant data.

The raw data view 1716 uses different routines for generating the views for displaying raw data. This can be SQL data in one embodiment. More specifically, the raw data view shows the underlying data to the user and can be accessed by drilling down on a particular aspect of other interfaces. One embodiment of such a view is a rain as shown as part of the user interface shown in FIG. 16.

Those skilled in the art will recognize that even though not show, the visualization station 1706 may include other routines for producing different views. For example, there may be other view routines for generating user interfaces such as an enterprise view or a meta-level view of the site configuration.

Methods for Creating and Updating a Visualization User Interface

Figure 6:
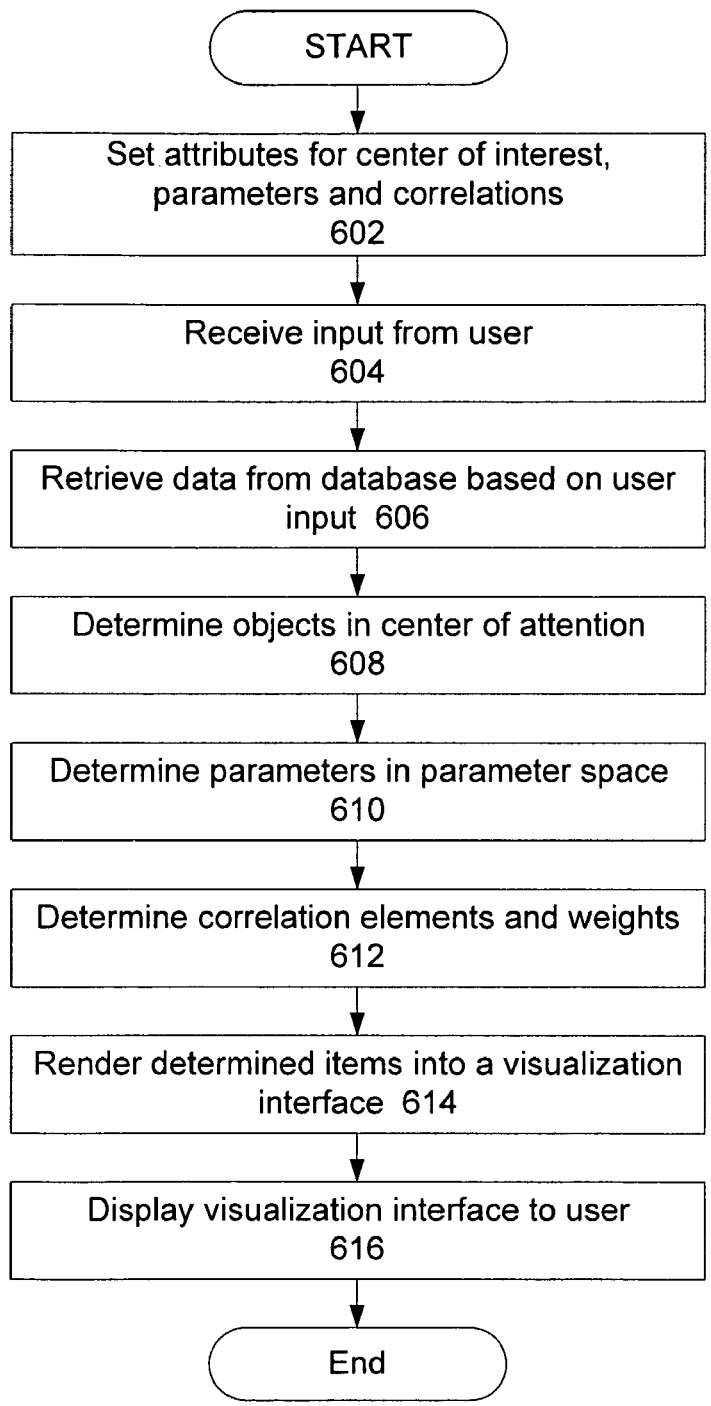
FIG. 6 is a flowchart of one embodiment of a method for creating a visualization user interface of the present invention.
Figure 21:
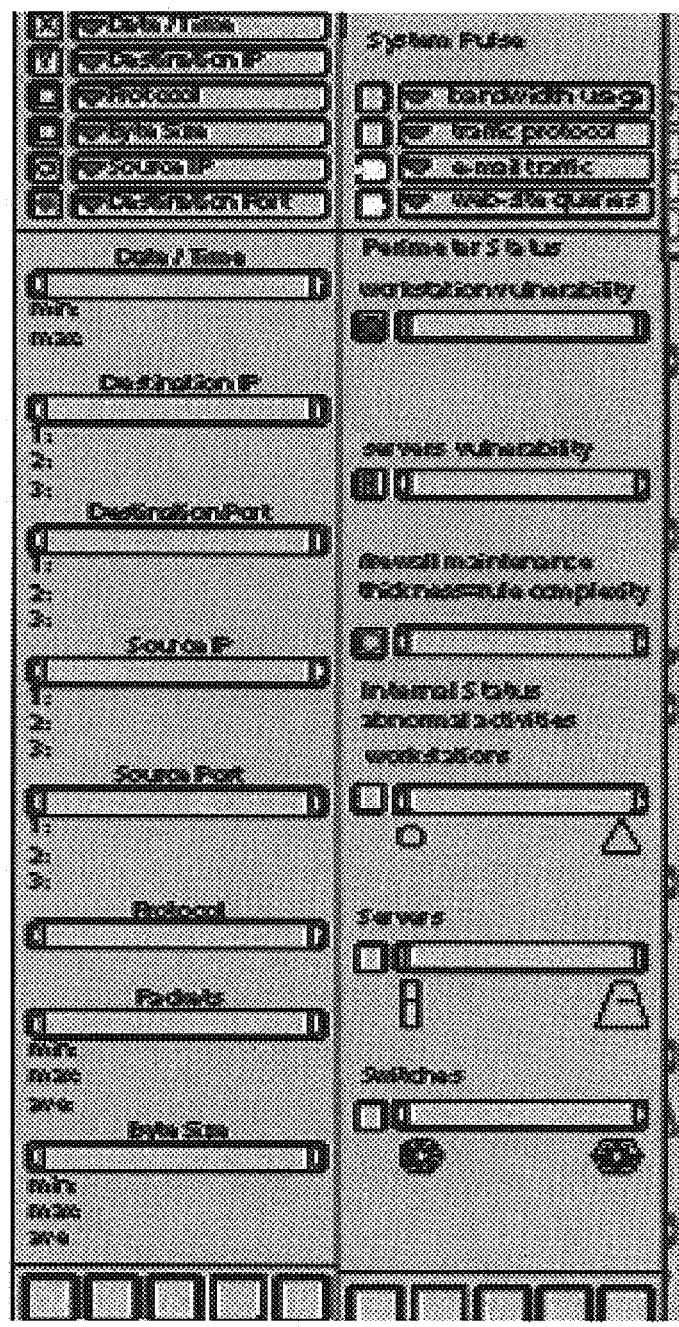
FIG. 21 is a graphical representation of an interface for input of data and settings for the visualization system of the present invention.

Referring now FIG. 6, one embodiment of the process for creating a visualization user interface according to the present invention will be described. The process begins with the visualization system 200 receiving input from the user 350 indicating the objects or objects that should be in the center of attention 102, the parameters that should be provided or listed in the parameter space 104, and the correlation elements 106 between the parameters and the objects that should be determined as well as thresholds for the different correlation levels. In this step, the user also selects the graphical format for the visualization user interface 100. In the preferred embodiment, a number of different formats for the graphical layout of the user interface are available as templates such as will be described below with reference to FIGS. 9A-13. Those skilled in the art will recognize that during this step the user may also provide various other types of information that are used by the analysis module 312 to determine what data will yield an object, a parameter or a correlation element. Then the visualization system 200 receives 604 inputs from the user. The input provided by the user is a visualization scenario and its constituent elements as will be described below in the context of network security. An exemplary interface for inputting this information is shown in FIG. 21. The user first selects an available database or databases they wish to view through the input device 302 or an enterprise management console.

The user then indicates which attributes contained in the database 206 they would like to select for viewing. Next the user provides a mapping of these attributes to entities in the center of attention 102 and selects a particular time range. An example would be to first select a group of computer network alerts and then define a group of computers that the alerts are associated with. This involves indicating which IPs are associated with what visual representation in the center of attention. Then during the query mode the alerts are associated with particular IPs by way of the alert beam.

The system 200 generates a query using the user input and receives 606 data from the database 206. The system 200 analyzes the data received from the database 206, and determines 608 items or objects that should be displayed in the center of attention 102. The system 200 also determines 610 parameters that should be displayed in the parameter space 104 from the received data. Finally, the system 200 determines 612 correlations between the objects in the center of attention and the parameters in the parameter space 104 and a weighting for each respective correlation element. The objects for the center of attention 102, the parameters for the parameter space 104, and the correlation elements 106 are then rendered into a visualization user interface 100. The visualization user interface 100 is then displayed 616 to the user.

Figure 7:
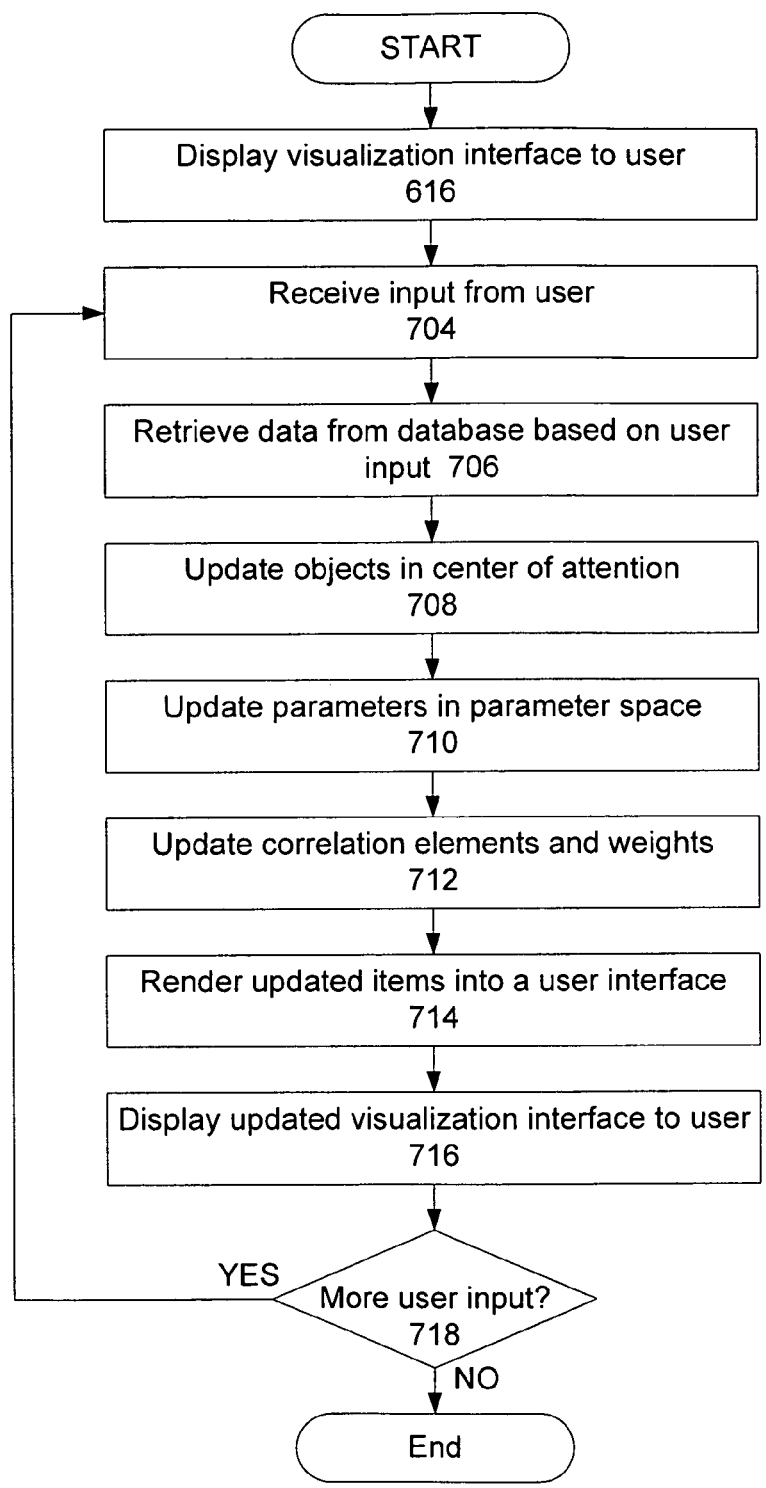
FIG. 7 is a flowchart of one embodiment of a method for interacting with the visualization user interface of the present invention.

Referring now to FIG. 7, one embodiment of the method for interacting with the visualization user interface 100 of the present invention is described. The method begins assuming that the visualization user interface 100 has been created such as using the process described above with reference to FIG. 6 and is currently being displayed 616. Once the visualization interface 100 is displayed, the user may use conventional input devices 302 such as a keyboard and mouse type controller to interact with the visualization interface 100. The user can select the constituent components of the visualization interface 100 such as the objects, parameters and correlations. In response to selection of an element by the user, the visualization system 200 modifies the interface 100 to show additional detail about the selected element. In step 704, the system 200 receives input from the user. The system 200 generates a query with the user input and receives 706 data from the database 206. The system 200 analyzes the data received from the database 206, and updates 708 objects that are displayed in the center of attention 102. For example, this may include changing the display attributes of the objects that were displayed in the visualization interface in step 616, showing objects that were not previously shown, or not displaying objects that were previously shown by the visualization interface 100 in step 616. The system 200 also updates 710 parameters that should be displayed in the parameter space 104 from the received data. Similarly, parameters may have their visual display characteristics modified, and new parameters may be added or existing parameters may be eliminated. Finally, the system 200 determines 712 correlations between the objects in the center of attention and parameters in the parameter space 104 and a weighting for each respective correlation element 106. Like objects and parameters, correlation elements 106, may be modified, eliminated or added. The objects for the center of attention 102, the parameters for the parameter space 104, and the correlation elements 106 are then rendered 714 into an updated visualization interface 100. The updated visualization interface 100 is then displayed 716 to the user. Finally, the methods tests or determines 718 whether additional user input has been received. If not, the method is complete and ends. It additional input has been received, the method returns to step 704 to receive input from the user.

Figure 8:
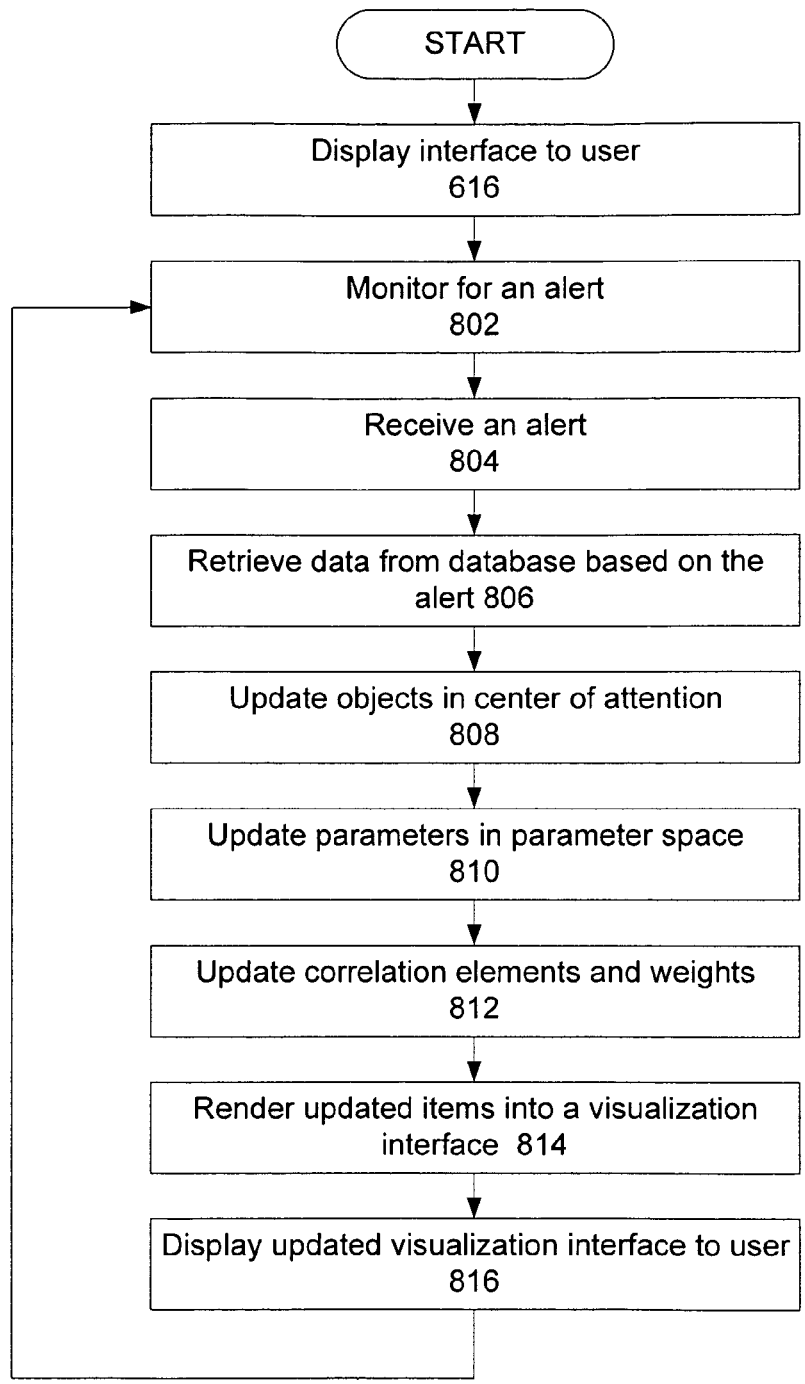
FIG. 8 is a flowchart of one embodiment of a method for updating the visualization user interface of the present invention responsive to an alert signal.

Referring now to FIG. 8, one embodiment of the method for updating the visualization user interface 100 of the present invention responsive to an alert signal will be described. This process is similar to that of updating the utilization user interface 100 in response to user input. The process begins with the assumption that the visualization user interface 100 is being displayed to the user in step 616. Then in step 802, the visualization system 200 monitors for an alert. As has been noted above, the visualization system 200 can be coupled for communication with other systems, such that these of the systems provide warning or alert signals. In response to receipt of such a warning or alert signal, the visualization system 200 retrieves 806 data from the database 206 using information provided in the alert. As has been described above for user input, the objects in the center of attention 102, the parameters in the parameter space 104, and the correlation elements 106 and their weightings are updated in steps in 806, 808 and 810. Next, the visualization interface 100 is rendered using the updated information in step 814, and the updated display is shown to the user in step 816. After step 816, the method returns to step 802 to monitor for additional alerts or warning signals.

Embodiments for the Visual Interface

Referring now to FIGS. 9A-13, graphical representations for a number of alternate embodiments for the visualization interface 100 of the present invention will be shown. Those skilled in the art will recognize that these alternate embodiments are provided only by way of example and are not an exhaustive list of embodiments for the visualization interface 100. Furthermore, each of the alternate embodiments is provided below to illustrate different forms for the overall visualization interface 100, objects and the center of attention 102, parameters and the parameter space 104, correlation elements, weightings for the correlation elements, groupings of the parameters as well as other elements of user interface 100.

The visualization interface 100 includes: a window campus 108, the center of attention 102, the parameter space 104, and at least one correlation element 106.

The window or canvas 108 that may be varied in size responsive to user input, and that defines the information space or display area.

The center of attention 102 is an area for displaying one or more objects. The center of attention may also be referred to as center region, center of interest or center of decision. The center of attention displays objects that represent items in a decision to be made. The center of attention 102 is preferably located in a central area of the window or canvas so that is a focal point for the user when the interface 100 is being displayed. In one embodiment, the center of attention 102 is a two-dimensional space that shows the relationships between objects. The objects in the center of attention 102 are preferably expandable or collapsible for greater and less levels of the detail. This allows the user to change the level of detail depending on the user's area of focus. The objects in the center of attention 102 are also displayed with different attributes such as color, size, shape and level of detail depending on the object's correlation values. Furthermore, the objects in the center of attention 102 can be highlighted or faded out, depending on events, attributes, correlation values or time. This can be done on an individual object level or for groups of objects.

The parameter space 104 is an area for displaying parameters related to the objects. The parameter space 104 may also be referred to as a peripheral region, a peripheral area, or an attribute-parameter region. There can be multiple parameter spaces, or the parameter space may be divided into sets of parameters. For example, the parameters could represent databases, database tables or any other number collection of data. The parameter space 104 is for any parameter, data, factor, event or other information that is used in making the decision. The parameter space 104 provides a region in which a graphical depiction of the parameters can be displayed. The parameter space 104 may take a variety of different shapes has will be disclosed below. The parameter space 104 in one embodiment is preferably positioned about and surrounding the center of attention 102. The parameter space 104 is preferably a radio placement about center of attention 102 that shows the relationship of the parameters to each other, as well as to the objects in the center of attention 102. Those skilled in the art will recognize that the parameter space 104 may also be a rectangle, square, a polygon, semicircular, or triangular. In one embodiment, the parameter's placement relative to the center of attention 102 can be used to differentiate parameters with respect another variable such as time. As has been noted above, the parameter space 104 can be divided into sectors to further differentiate different segments or sub segments of parameters that correspond to user configurable divisions or hierarchies of parameters. The sectors may also include text annotations or highlighting. The parameters in the parameter space 104 are highlighted or shown with usually distinct attributes. Based on different levels of correlation, time, intensity, change, growth, and size. Furthermore, in the circular embodiment, the parameters preferably radiate outward and any type of linear, logarithmic or exponential scale can be used for their outward expansion.

A projection of the objects on the parameter space 104 shows the relationships between parameters and objects. The projections are filtered for the most relevant projections to the center of attention. The filtering is done by determining whether the parameter space 104 has any parameters/variables for objects in the center of attention 102, and if so then selecting those parameters for the parameter space restricted to the objects in the center of attention. The filtered set of projections is the correlation elements. Correlation elements are the subset of projections that exhibit high correlation values. In one embodiment, a weighted correlation is used in which: a) the strength of correlation is persistent in time, as well as the sum of correlation values; b) correlation is not shown for non-interesting cases, so some weights are set to 0; and c) the correlation weights are values determined by the user, and they can represent uncertainty, relevance, availability, interest or any other assessment. The correlation elements are a visual indication of the relationship between the center of attention 102 and the parameters space 104. In other words, the correlation elements provide a visual link between disparate elements of the center of attention 102 and the parameters space 104. For the correlation elements 106, they are displayed according to their attributes including: strength of correlation (weighted, true/false, normalized, intensity, and persistence) and how the correlation is displayed (line, icon, shading, dotted line, line thickness).

With the visualization interface 100, there are defined graphical elements to represent the center of attention 102, the parameter space 104, the objects, the parameters, and the correlation elements 106. Each of these defined graphical elements may take a variety of different forms. The visual property of these different forms depends on the attributes of the objects or parameters themselves, position in their respective spaces, and the weight of the correlation elements. Each of these define graphical elements may have a variety of visual clues to identify their significance and meaning including but not limited to position, size, shape, brightness/intensity, iconic representation, shape replacement, and color. The visualization interface 100 is advantageous for a number of reasons including that: it can accommodate any level of scalability; can modify the level of detail based on information changes, alerts, or strength of correlation; be combined with other graphical user interfaces; and provide additional detail based on selection or rollover on any element in the visualization interface.

Figure 9A:
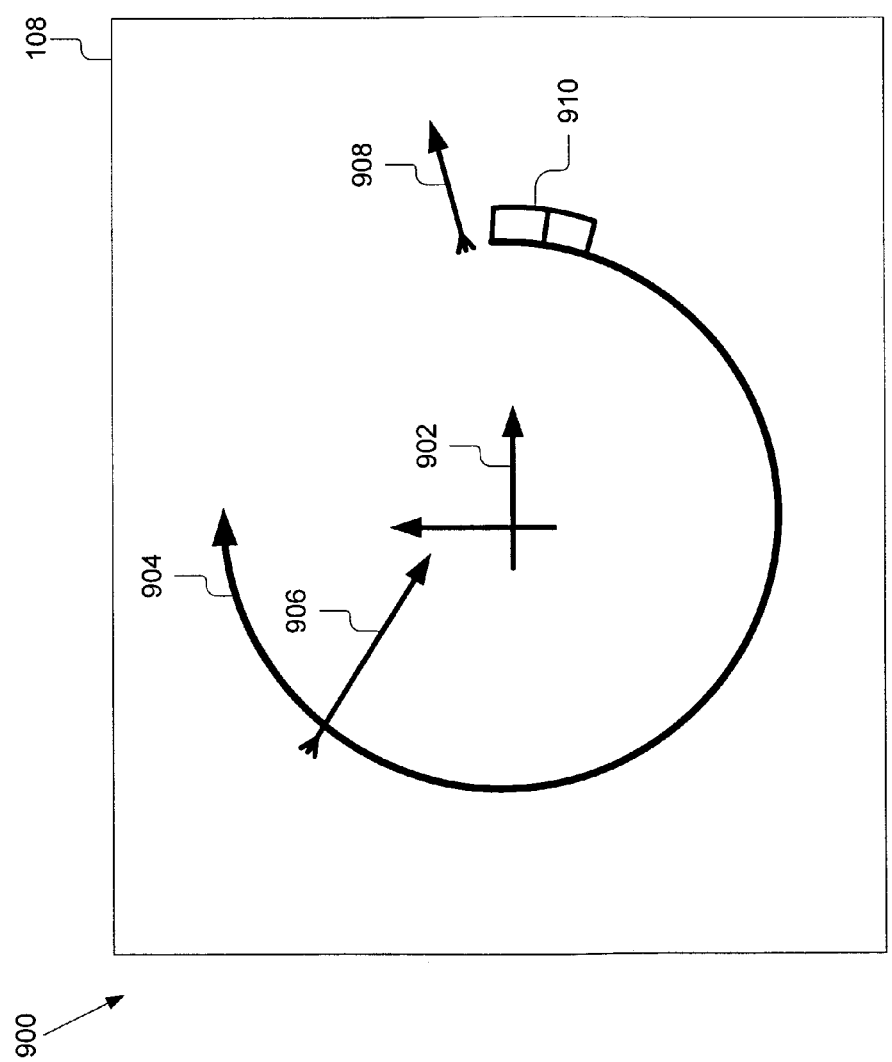
FIG. 9A is a graphical representation of a first embodiment of the visualization user interface of the present invention.

Referring now to FIG. 9A, a first embodiment of the visualization user interface 900 of the present invention is shown. In this embodiment of the visualization interface 900, the center of attention 902 is a two-dimensional space near the center of campus or window 108. The center of attention 902 in this embodiment advantageously can expand or contract depending on the number of objects that must be displayed. About the periphery of the center of attention 902, the parameter space 904 is defined as a circle or arc that extends outward. The parameter space 904 may be divided into any number of segments to provide sub-groupings of the parameters. As can be seen, only two parameters 910 are shown as sectors on the inner circumference of the parameter space 904. Arrow 908 indicates an additional characteristic or attribute of the parameters 910 can be displayed within the visualization interface 900. For example, this additional characteristic may be time such that more recent parameters 910 are added to the parameter space proximate the center of attention 902 while older parameters are moved outwards. The correlation element 906 is shown as an arrow between positions in the parameter space 904 and a position in the center of attention 902. While only a single correlation element 906 is shown in FIG. 9A, those skilled in the yard will recognize that any number of correlation elements 906, may be shown by the visualization interface 900.

Figure 9B:
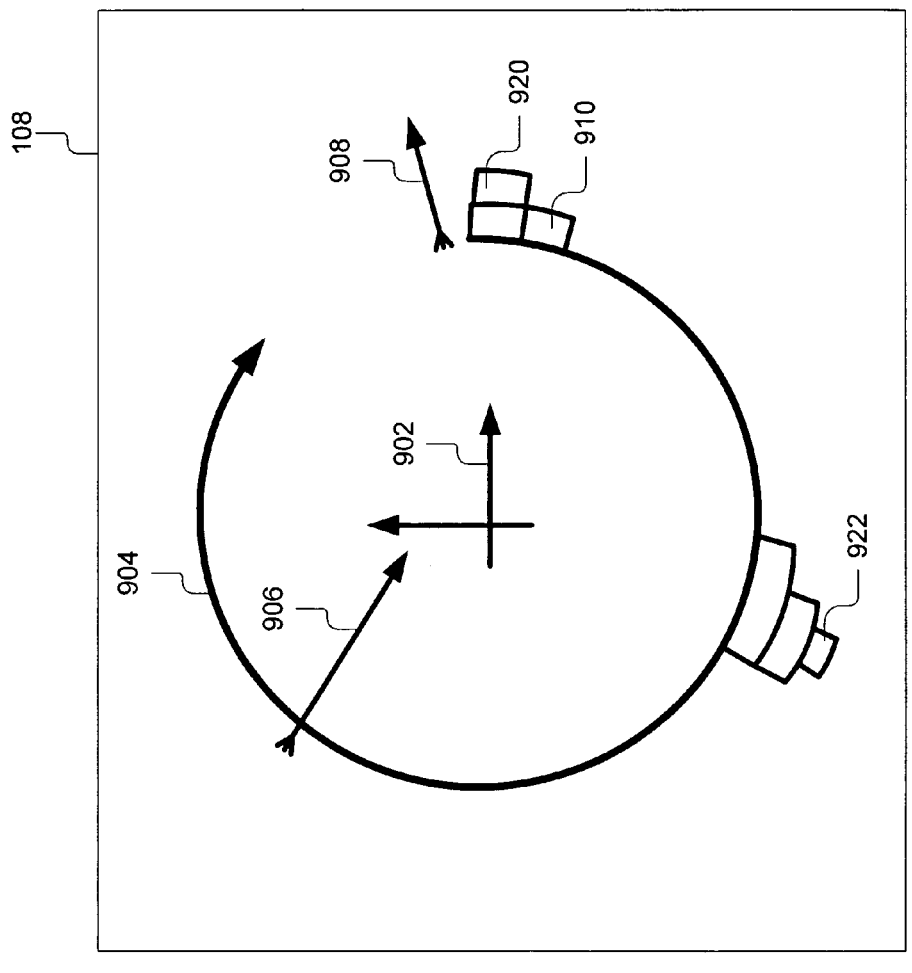
FIG. 9B is a graphical representation of the first embodiment of visualization user interface of the present invention with an alternate display of the parameter space.

Referring now to FIG. 9B, a graphical representation of the first embodiment of visualization user interface 950 of the present invention with an alternate display of the parameter space 904. For ease of understanding and convenience, like reference numerals as those used in FIG. 9A are used for like elements of the visualization interface 950. As can be readily seen, the visualization interface 950 includes two groups of parameters 920, 922 which illustrate how different groups of parameter can be distributed about the periphery of the center of attention 902. The visualization interface 950 also illustrates how parameters 920, 922 may be positioned outward from the center of attention 902 based on the function defined by line 908. While not shown and FIGS. 9A and 9A, color, size of elements, position of elements, and line format may be used to differentiate the different components of the visualization interface 900/950.

Figure 10:
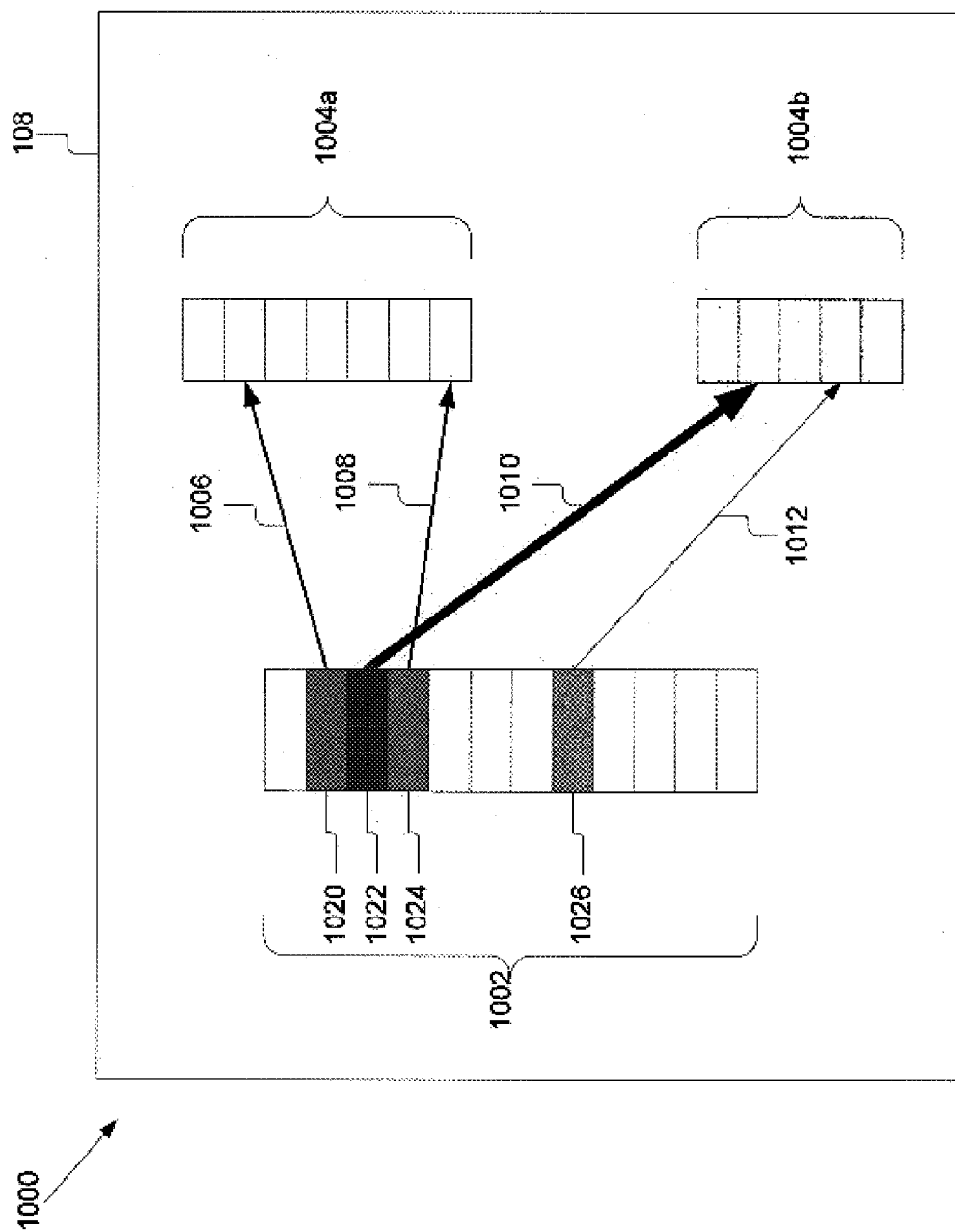
FIG. 10 is a graphical representation of a second embodiment of the visualization user interface of the present invention.

Referring now to FIG. 10, a graphical representation of a second embodiment of the visualization user interface 1000 of the present invention. This embodiment of the visualization interface 1000 again has a canvas or window 108 within which the center of attention 1002, the parameter space 1004a, 1004b, and the correlation elements 1006, 1008, 1000 and 1012 are displayed. For this embodiment, the center of attention 1002 is a series of boxes stacked vertically at the left center of the canvas 108. Each of the boxes that form the center of attention 1002 represents an object within the center of attention 1002. The parameter space is defined as a first set of boxes 1004a and a second set of boxes 1004b. This embodiment of the interface 1000 illustrates how the parameters may be grouped into sets. Each of the boxes with the end of the first set, and the second set 1004a, 1004b, represent a different parameter associated with the decision to be made. The correlation elements 1006, 1008, 1000 and 1012 are depicted as a line between one box in the center of attention 1002 and a box in the parameter space 1004a, 1004b. Furthermore, the correlation elements 1006, 1008, 1000 and 1012 have different thicknesses depending on the weight of the correlation. For example, the correlation element 1010 is shown with greater thickness that corresponds to a more significant correlation between object 1022 and a parameter and parameter space 1004b. Moreover, the objects 1020, 1022, 1024 and 1026 in the center of attention 1002 can be shaded for additional emphasis so that the user's attention is focused on these objects. While not shown as such, the parameters in the parameter space 1004a, 1004b may be similarly shaded to correspond to the emphasis that has been added to the center of attention 1002.

Figure 11:
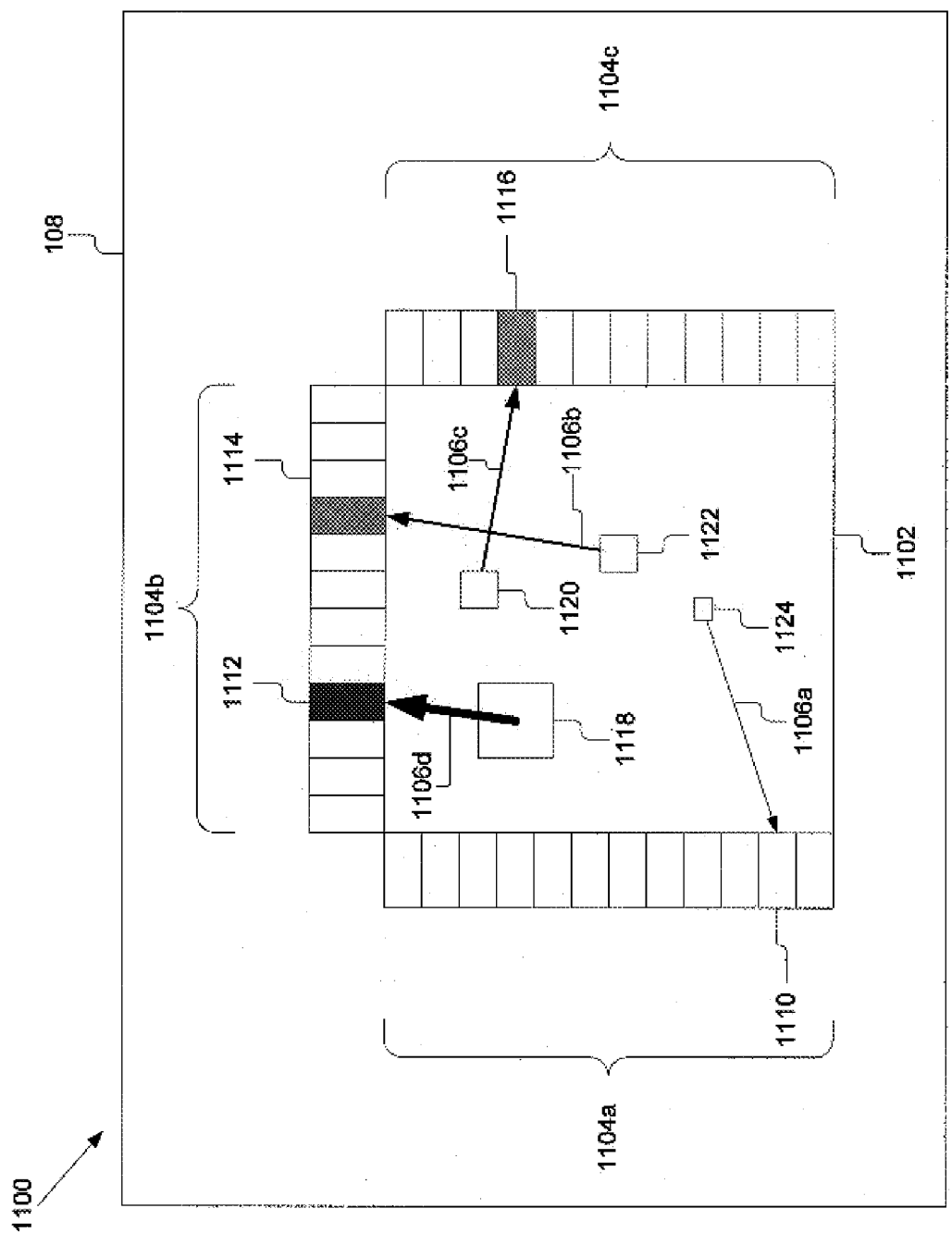
FIG. 11 is a graphical representation of a third embodiment of the visualization user interface of the present invention.

Referring now to FIG. 11, a graphical representation of a third embodiment of the visualization interface 1100 of the present invention is shown. The visualization interface 1100 provides a canvas 108 in which the center of attention 1102, the parameter space 1104, and the correlation elements 1106 are displayed. The center of attention 1102 is preferably a rectangle or square positioned near the center of the canvas 108. Within the center of attention 1102, a plurality of objects 1118, 1120, 1122 and 1124 are displayed. This embodiment of the visualization interface 1100 shows how the size of the objects 1118, 1120, 1122 and 1124 can be varied for emphasis depending on the importance of the object and the strength of the correlation. For example, one object 1118 is shown with a large rectangle and has a proportionally larger correlation element 1106d to parameter 1112 as compared with another object 1124 that has only a small correlation 1106a to parameter 1110. In this embodiment, the parameter space 1104 includes a plurality of boxes around three sides of the center of attention 1102. The placement of the boxes around the periphery is advantageous to allow the correlation elements 1106 to interconnect parameters 1110, 1112, 1114 and 1116 and objects 1118, 1120, 1122 and 1124. The use of different sides of the center of attention 1102 also allows the parameters 1110, 1112, 1114 and 1116 to be grouped in two different sets 1104a, 1104b and 1104c. Like other embodiments, the parameters 1110, 1112, 1114 and 1116 may be shown with shading depending on their importance, and the level of correlation to the objects 1118, 1120, 1122 and 1124.

Figure 12:
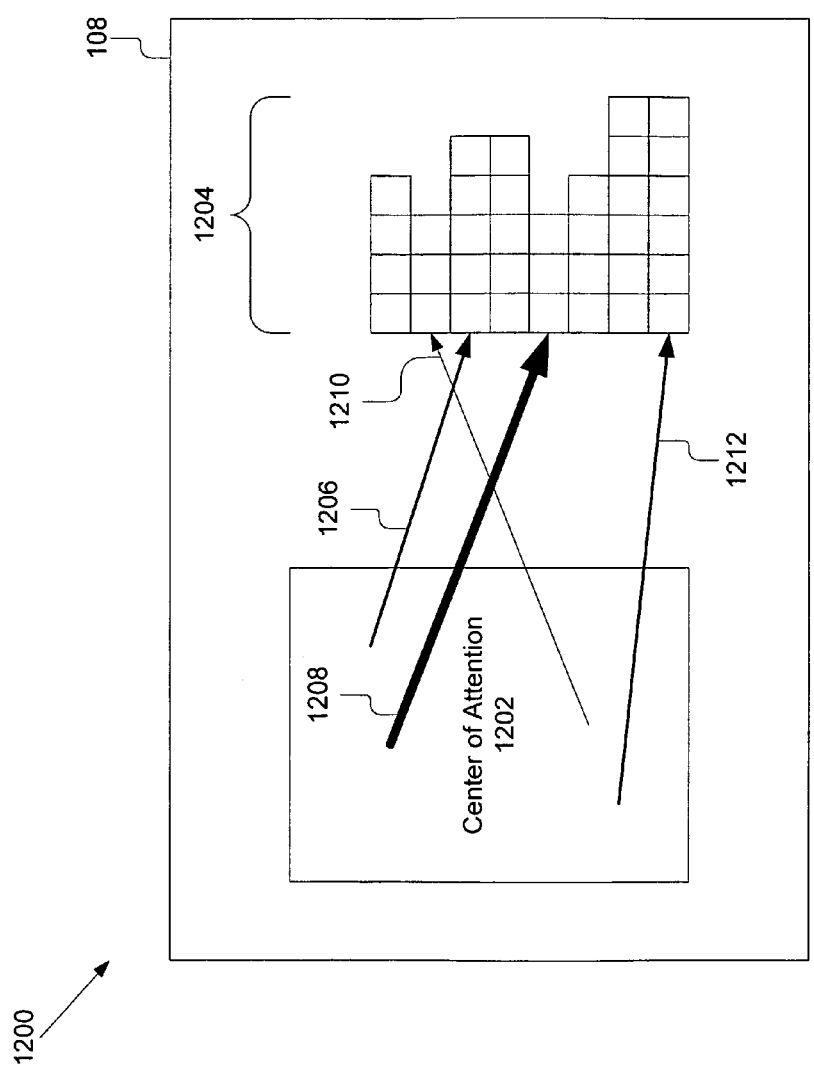
FIG. 12 is a graphical representation of a fourth embodiment of the visualization user interface of the present invention.

Referring now to FIG. 12, a graphical representation of a fourth embodiment of the visualization user interface 1200 of the present invention is shown. The visualization interface 1200 provides a canvas 108 within which the center of attention 1202, the parameter space 1204, and the correlation elements 1206, 1208, 1210 and 1212 are displayed. The center of attention 1202 is preferably a rectangle or square positioned near the left center of the canvas 108, but the center of attention 1202 could take any variety of different shapes. The parameter space 1204 is an array of squares (or other shape) with each square representing the parameter. The parameter space 1204 is aligned along a left edge and the squares are positioned in rows that extend rightward. This embodiment of the visualization interface 1200 demonstrates how the parameter space 1204 may have a plurality of sets the parameters (e.g., the rows of parameters), and how the parameters can be order ranked within each set. Based on any number of pre-defined functions, the position of a parameter more toward the right indicates a decrease in significance. As with other embodiments, the correlation elements 1206, 1208, 1210 and 1212 are each shown as a line with the thickness of the line indicating the strength of correlation and an arrow indicating a direction of correlation. The correlation elements 1206, 1208, 1210 and 1212 have one end at a fixed position within the center of attention 1202, and the other end attached to a corresponding parameter in the parameter space 1204. While the correlation elements 1206, 1208, 1210 and 1212 are shown as being connected to the leftmost parameter in each row, that is only by way of example, and the correlation elements 1206, 1208, 1210 and 1212 could be attached to any parameter in the parameter space 1204.

Figure 13:
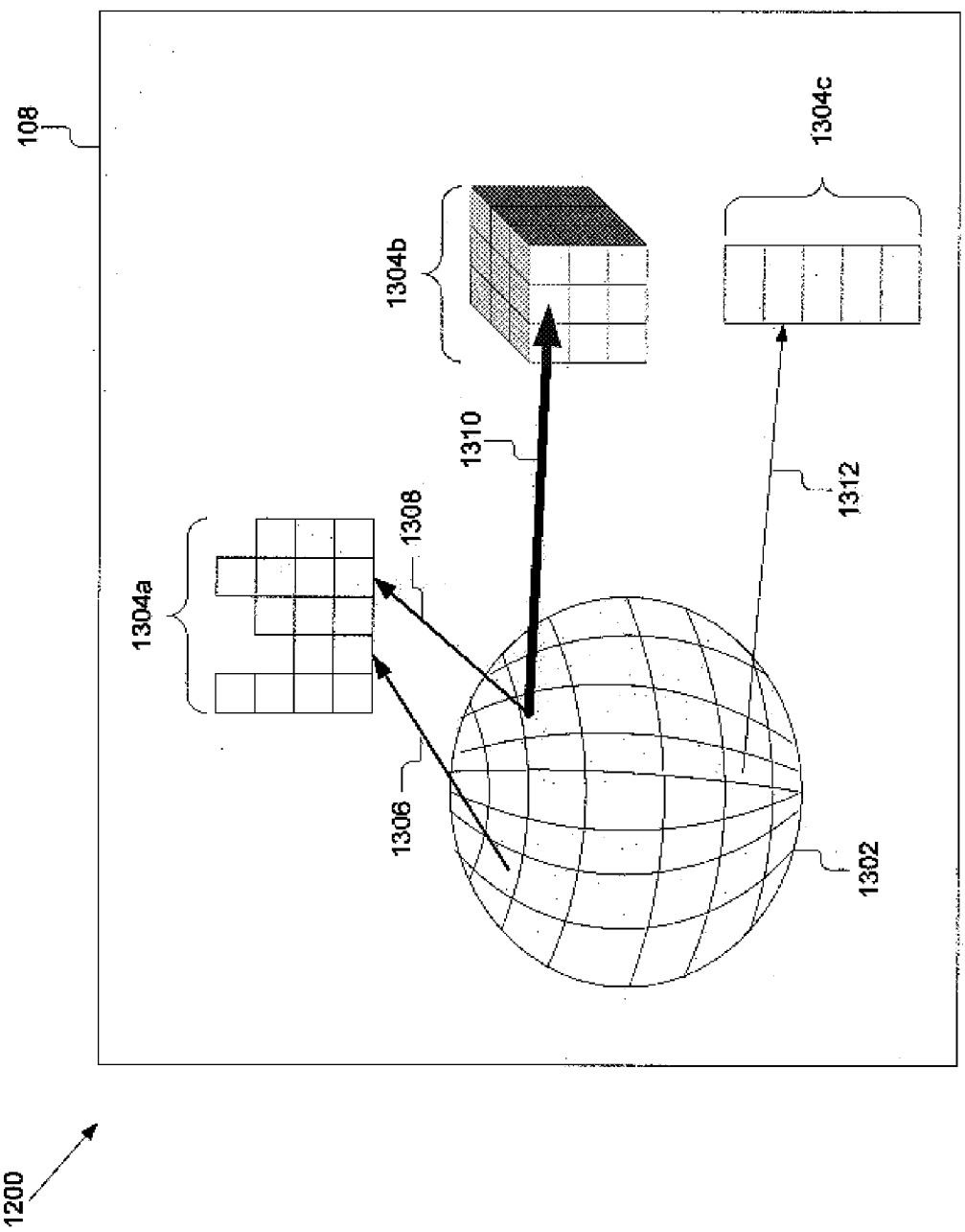
FIG. 13 is a graphical representation of a fifth embodiment of the visualization user interface of the present invention.

Referring now to FIG. 13, a graphical representation of a fifth embodiment of the visualization interface 1300 of the present invention is shown. The visualization interface 1300. The visualization interface 1300 provides a canvas 108 within which the center of attention 1302, the parameter space 1304, and the correlation elements 1306, 1308, 1310 and 1312 are displayed. The center of attention 1302 is preferably a three-dimensional sphere positioned near the left center of the canvas 108. The visualization interface 1300 illustrates how the center of attention 1302 may have various different forms that allow objects to be positioned within the center of attention 1302 including any variety of three-dimensional shape or perspective view. The visualization interface 1300 also illustrates how the parameter space 1304 may be grouped into sets 1304a, 1304b and 1304c of data and how each respective set may be presented in radically different visual formats. As can be seen, the first set 1304a of data in the parameter space 1304 is an array of squares with each square representing a parameter in the parameters set 1304a. The squares are similar to those that have been described above with reference to FIG. 12, however, they are aligned along the bottom edge and extend upward. The second set 1304b of parameters in the parameter space 1304 is represented as a group of cubes. Finally, the third set 1304c of parameters in the parameter space 1304 are illustrated as a series of rectangles. Like previous figures, the correlation elements 1306, 1308, 1310 and 1312 are shown as weighted lines. Thus, it will be apparent to those skilled in the art that the parameter space 1304 may be divided such that different graphic representations best suited to display and convey information about a parameter set can be used.

Specific Example for Network Security

Figure 14:
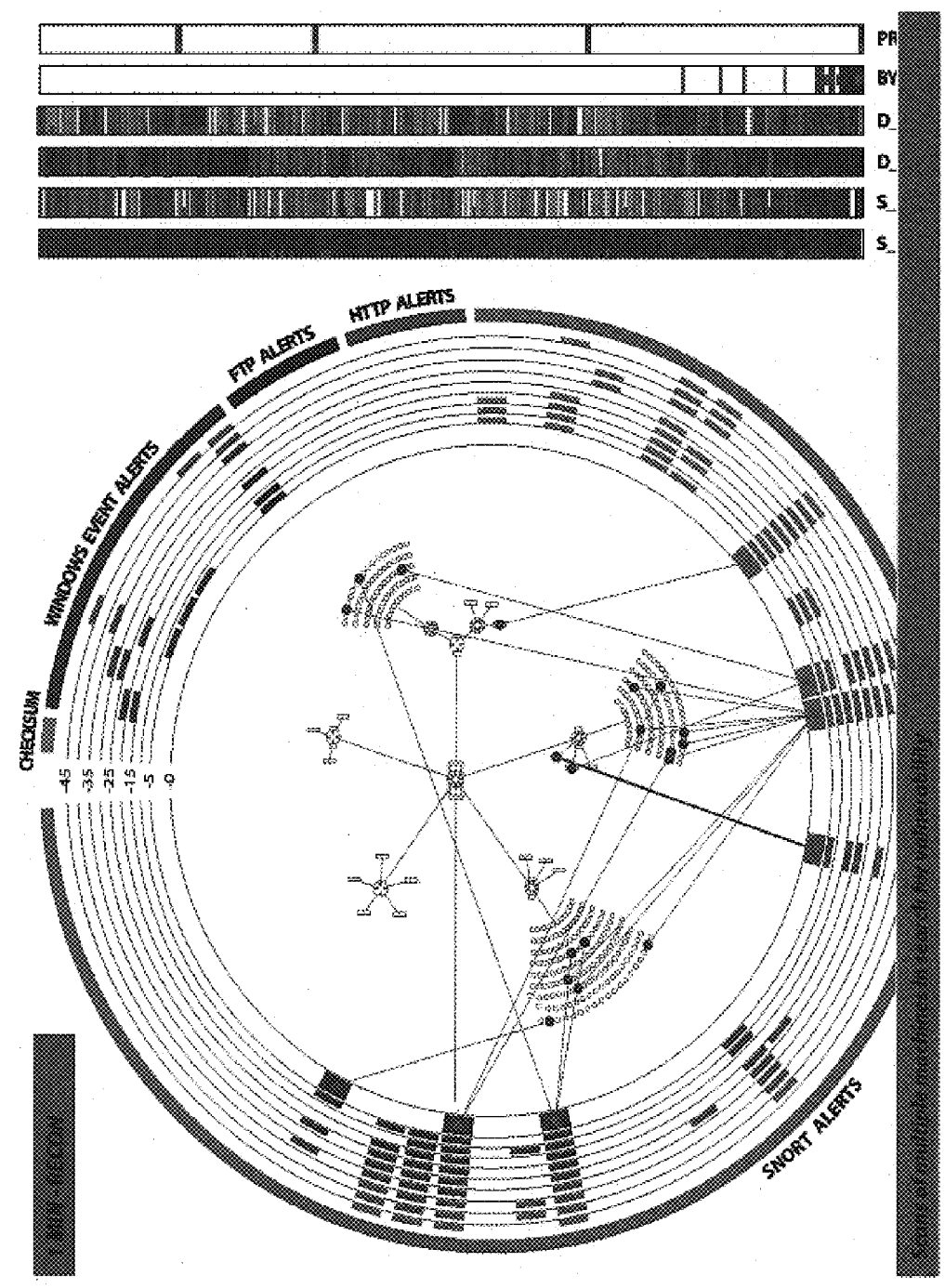
FIG. 14 is a graphical representation of a sixth embodiment of the visualization user interface of the present invention adapted to show a network and security parameters.

The visualization interface 100 of the present invention has the capability to convey a continuum of feedback ranging from the overall status of a system to granular details. Security of cyber-environments can be increased by providing: a new generation of intuitive, extensible, usable visualizations that increase situational awareness to quickly detect, diagnose and respond to new threats before they have a large impact; and visual continuity to the information space to address the needs of the whole spectrum of people involved in the security decision making process. This application of the present invention to cyber security will now be described with reference to FIG. 14. FIG. 14 is a topology map view of an embodiment of the present invention illustrating a perimeter structure (parameter space), a network topology map (center of attention), along with a waterfall display that depicts data for the associated topology.

The visualization tool in FIG. 14 is designed to increase situational awareness and increased analysis abilities for monitoring cyber-anomalies. The visualization system 200 provides users with a global view of network sensors and events, while simultaneously reducing the cognitive effort and time needed to pinpoint critical situations. Complex cyber-situation assessment is attained by visual correlation between disparate network events and their locations. Users can pick and choose which network events and sensors to bring into view and can control which connections (relationships or correlation elements) between events and sensor should be displayed. The visualization system comprises several components:

Network Topology View (center of attention): The topology view provides an operator an overall context and summary of the network activity. In addition, the user can zoom in and out as well as shift focus to different areas of the network. This enables the user to switch from a holistic view of the entire enterprise to the detailed view of just a few critical network nodes.

Alert Rules View (parameter space): Network event types (rules) are arranged in a set of concentric rings around the topology view. The events are sorted along the rings based on the event type and the rule that was triggered while each ring represents a different time period. Events are organized in hierarchical fashion based on their log (e.g., Snort, Firewall, HIDS) and the log specific groups. The rings move outward based on time.

Network Event View (correlation events): A network event occurs when an alert rule is fired as a result of suspicious activity. The event is then displayed as a line from the rule location in the innermost ring to the corresponding network sensor in the topology map. To reduce clutter, just events in the innermost ring are represented as lines. The other rings generally show only the number of events for each tripped rule during a specific time window.

Additional visualization cues: When several events relate the same rule to the same sensor within the period of time represented by the innermost ring, a single event beam replaces the alerts or events. In addition, the beam can connect a topology node to the events in the ring. The size of a node in the topology view also depends on the number of different events related to that node.

Filtering: The system 200 provides several mechanisms for reducing clutter and focusing on selected sub-sets of events. Some filters are based on the number of alerts or number of different types of alerts relating to a single node, while other filters are based on which nodes are currently in the topology view.

The integration of these visualization components enables the fusion of many events and sensors and provides "at a glance" situational awareness. The hierarchical arrangement of alerts is scaleable in the number of sensors and rules used. Trending, i.e., repetition of alerts, can be identified through the use of the rings around the topology map. Drill down into the raw data of the alerts is available by selecting an event line or a node in the topology map. However, this visualization embodiment has been optimized for the particular application of intrusion detections.

The ring structure illustrates the alerts over time and the innermost ring represents the most recent alerts for a specific time duration. A block may be provided to represent an alert and this alert can be connected to a node on the topology with an alert beam. A time interval can be set over which alerts are received. For example, each ring may represent a 5 minute window of time. As the 5 minutes pass, the inner row of alerts will be moved out one ring and each following ring will be moved out one ring. After the alerts reach the outside of the rings then it may not be visible. The time windows for a ring can also be set to various time frames. Another example is where the inner rings are set to 5, 10 or 15 minute intervals and the outer rings progress to longer time windows such as an hour, several hours, days, or even weeks.

The colors on the ring blocks can represent can represent the number of alerts received during a period of time. In other words, the color can represent the number of alerts divided by the time frame defined for the ring. The ring block colors may have a range of color representing different numbers of alerts. For example, cooler ring colors, such as blue or purple, may be used for low levels of activity. Warmer colors, such as yellow or red, may be used for high levels of alert activity. Thus, high levels of activity become more easily apparent and hot spots may be represented. An analyst can modify the threshold for colors used or the threshold may change over time as certain patterns are detected.

The alert beams represent the node with which alerts in the ring are associated. The node sensor can provide a severity that will be reflected in the alert beam color. The alert beam width can represent the persistence of the alerts over time.

The present invention allows an analyst to select a particular hot node and then write a log out to an HTML page for group viewing. This allows other analysts to view the HTML page and help determine what the state of the system currently is. The analyst can write out a single snapshot of data and a graphic image of the topology map. Alternatively, an analyst can store a running log of the graphic topology map and related alerts over a defined period of time. For example, a timed snapshot of the graphic topology map can be appended every N minutes to the log. In addition, an analyst can create a user defined snapshot or filter that can be activated at particular intervals.

Executable macros can also be created by an analyst. The analyst can pre-record actions taken to analyze the topology map and certain alerts. Then the analyst's inquiry can be re-executed to save time for the analyst. For example, the analyst may check three machines with separate alerts, log this information to HTML format, and record certain machines with a defined IP range. Once such a macro sequence is prepared, then the sequence can be reused or modified as desired. Powerful reporting features can also be provided where the analysts can query from multiple log databases. This can give an analyst an extracted log database or a user refined log.

The present invention also provides a visualization paradigm that can be modified using interdisciplinary development methodologies that allow for the perceptual grouping of disparate and heterogeneous types of data such as computer network activity, telephone usage logs, analysts summary, security alerts, etc., across a temporal horizon. This extensible, visualization paradigm can include the ability to express information attributes such as type, relevance, reliability and availability. This scalable visualization concept can support large amounts of data that can be temporally linked in order to see complex patterns over time across many disparate data sources.

The circular and layered visualization paradigm allows for: 1) "At a glance" indication that gives an overall understanding of states of the system and if potential problems are developing. 2) Representation of specific data extracted from the varied sensors via multi-dimensional mapping. 3) Information panels that represent a subset of multi-dimensional information across a specific amount of time. 4) Creation of complex information panels with heterogeneous data. 5) Linking of information sources via relationship vectors that can illuminate complex relationships of data across numerous information panels. 6) Rapid hypothesis testing by facilitating complex interaction with data. 7) A "visualization continuum" that aids communication and analysis across an organizations hierarchy.

The present system and method is based on visualizing the relationships between specific network alerts and the local network topology. The network topology is in essence a collection of resources and thus the visualization provides a way to visualize time-dependent events, enterprise resources, and the connection between them. The notion of time-dependent events is first defined. A generic event can be comprised of at least four fixed attributes, namely, when, what, where and weight. An event may also contain additional information, such as more detailed information about the type, severity, or where it occurred. As such, we can represent an alert as an n-tuple of attributes. Any resource that has a generic associated event can also be represented as tuples, leading to a uniform representation for both events and resources. A unified tuple is mapped into the center circle using via a projection mapping, while the radial time line, is replaced by a generalized mapping. Organizing the network alert types around the circle according to groups of alert types can be generalized to a hierarchical grouping based on a general mapping. Finally, tuples on the perimeter are linked to tuples inside the circle based on a fourth mapping.

The generalized visualization structure may be then applied to a whole set of cyber-problems such as managing computer resources such as down time, maintenance and vulnerability assessment. In addition, this structure may be used to monitor successful file transfers, program executions, and applications where complex relationship building and understanding is needed.

In many environments, there is the need for seamless communication of important information across the institutions organization hierarchy. This can be defined as a visualization continuum. However, it is often very difficult for analysts of raw data to communicate complicated issues to senior decisions makers in a way that easily understood. One hurdle to seamless communication is that there is a lack of visualization tools that support different levels of data understanding. For instance, analysts are interested in examining raw network data and logs. They report the analysis of this information to a manager who must then take this data and present it up the command chain. The present invention uses visualization strategies for managing these dynamic levels of details in the data. Many techniques have been explored in the graphics community, but these tend to focus on static views of the data and not on dynamic resources, their mappings and the relationships between them.

As opposed to the static view in which all the connections have a similar representation, links within the new system will incorporate a set of visualization metaphors to clearly express their attributes such as type, relevance, reliability and availability. Furthermore, the data interconnections are not be based on a single type of representation such as timeline or geographic view. Instead, the analysis can dynamically switch between different viewpoints or perspectives changing the center of attention. The analyst may switch quickly between different views of the data where different nodes are at focus. Furthermore, organizing the data using several focus points (deforming the graph so some sections are more noticeable than other) can increase the likelihood that a yet unseen connection will come to light. For example, the system highlights or visually emphasizes all the events of certain type that accrued at a certain time, or that exhibit particular attribute (money exchange).

New methods of network attack and attack paths are being developed, however this invention has the probability of the likelihood of particular characteristics built into the models. The system 200 can visually encode this uncertainty of the models into the visualization paradigm. This enables the analyst to combine their judgment and the models prediction regarding the likelihood of an occurrence or reliability of the data. The present invention provides at least three separate visualizations that provide the user with different aspects and viewpoints of the analyst decision-making process, and a holistic view of the network security status, when integrated.

One interface is a Decision Maker View with a network topology. This visualization concept helps the analyst understand the overall context and summary of the network activity of their network system, by indicating "at a glance" which user configured alerts have been tripped, in combination with the representation of the topology of the network. This visualization is viewed as a lens that can be moved around a topology map with the ability to focus on a small segment or easily scale to see a much larger enterprise. After a section of the topology is identified, the analyst determines which logs (Snort, Firewall, HIDS, etc.) and which rules from those logs he wants to study.

Figure 15:
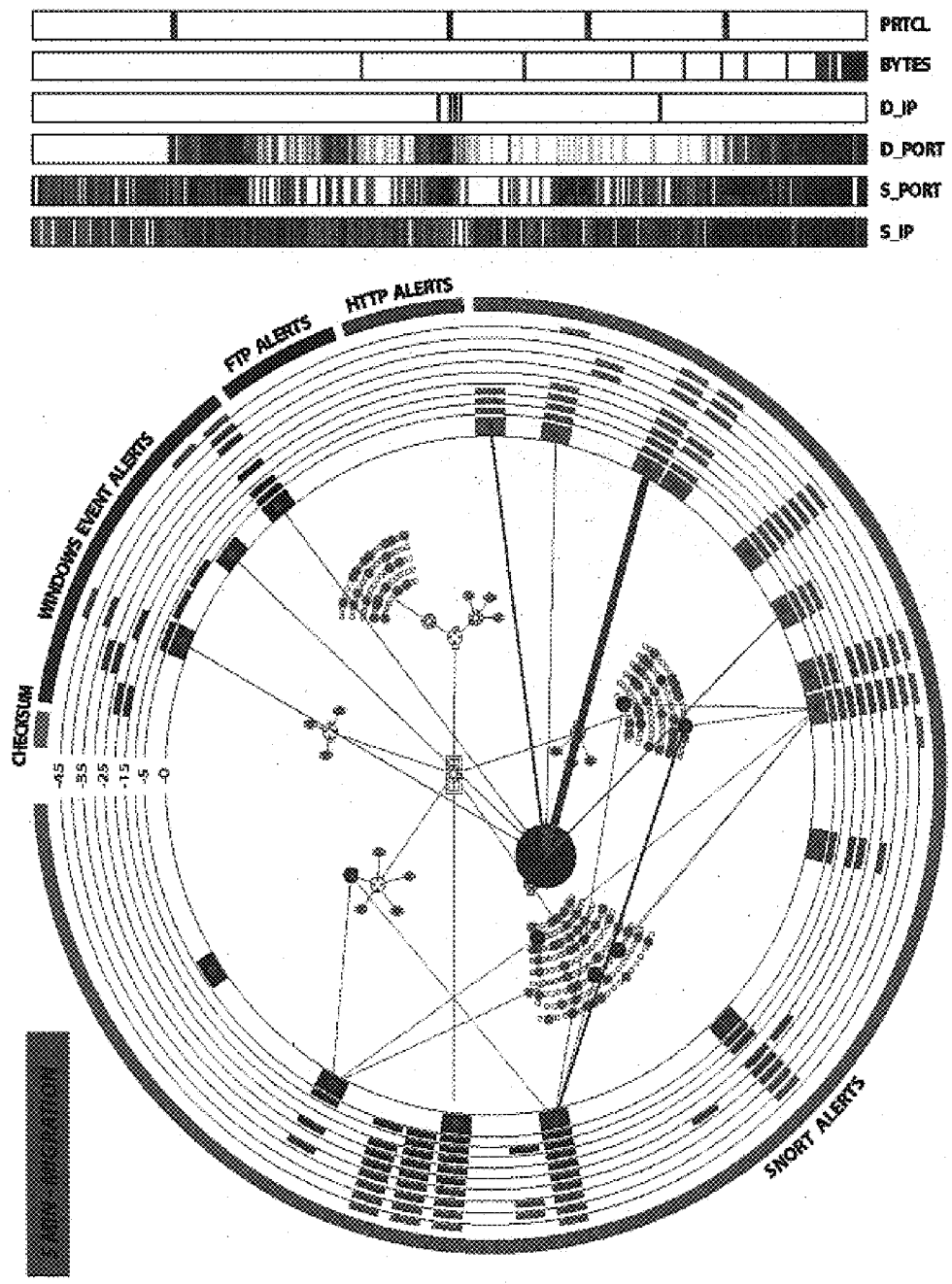
FIG. 15 is a graphical representation of the sixth embodiment of the visualization user interface of the present invention showing changed states from FIG. 14 for the objects in the center of attention, parameters, and correlation elements.

This user-configured log and rule set constructs a perimeter around the network or sub-network in question as in FIG. 14. When a rule is violated in a specific log or an alert is tripped, a bar appears in the sector assigned for the log and rule. Simultaneously, an alert halo appears over the node where the violation occurred. This alert halo is linked by a line to the perimeter position defining the rule and log violated in the current time sample as in FIG. 15. FIG. 15 is a topology map view of an embodiment of the present invention illustrating a perimeter structure, a network topology map, a plurality of halos representing alerts, and alert beams representing which nodes are having particular alerts. By tying the alert halo over the specific machine in the network to the rules violated, an analyst can see which machine has an alert associated with it and if this machine has multiple alerts across different logs, which may indicate a sophisticated intrusion attempt. In the case of intentional protocol subversion or other attempts to avoid detection by sensors, the visualization of a comprehensive set of alerts including logs from both networks and hosts allows the users to see other indicators of an attack (such as checksum irregularities or windows log results).

There are several filtering capabilities with this system that allow the user, for instance, to see only machines with 3 alerts. In addition, the user can filter based upon rules tripped, which allows the visualization of the propagation of a problem across an entire network. Some of the attributes of this display are: a) A fusion of many sources (represents large number of relationships across disparate logs); b) Host based and network based information; c) "At a glance" indication; d) Hierarchical arrangement of alerts based on severity; e) Root cause indication; f) Scalable in the amount of sources; g) Scalable in the size of network topology; h) Ability to see most recent history of alerts; i) Ability to drill down to raw data alerts; and j) Ability to tag particular areas of interest and write notes.

Another visualization interface is an analysis view that uses a scatter plot. The analysis view visualization provides the user with the ability to assign a multitude of variables such as flow data, snort alerts tripped, FTP alerts tripped to graphic properties of objects such as x and y dimensions, color, size, and brightness. This allows the user to quickly test hypotheses and compare different types of data across a larger time span. The scatter plot tool illuminates different relationships between different fields of interest. The plot is scalable and focuses on the temporal aspect of the data. Such a scatter plot could be added to the unified views of FIGS. 14 and 15 as shown in FIG. 16 or could be used in place of the waterfall graph. FIG. 16 illustrates a unified view of a topology map, a waterfall view and an expanded waterfall view.

In addition to the configurable variable mappings of the scatter plot, this display can be an interface for filtering through the data by ranges or by individual values in a particular field. For example, an analyst may turn off any activity associated with a particular destination port, whether or not the destination port is mapped into the current view.

The inverse filtering functions are also supported. For instance, if an analyst is interested in activity from a domain that may be malignant to a particular destination port, the analyst can turn off any activity to the determined port as well as any activity coming from the specific range of source IPs. This ability can be useful if data filtration by an attacker is suspected. Quite frequently ports that should not be open on particular machines are opened and data is streamed out. This view in combination with the topology view indicates to the analysts which machines should have particular ports open and which should not. The visual Boolean interaction allows an analyst to seek or analyze network data that may be correlated to any level of network intrusion. This tool can also be applied to machine specific data that may reflect intrusion or compromise, either independently or in connection with the network based data.

The tool also supports the overlay of particular alerts (Snort, Firewall, windows events, etc.) with network flow data so that an analyst can correlate disparate data sets over time. Some of the attributes of this display are: a) Fusion of many sources (represent large number of relationships across disparate logs); b) Multiple recommended views with ability to be defined and customized; c) Temporally based; d) Scalable in the number of sources that can be handled; e) Scalable in the amount of data that can be handled; f) Allows for quick hypothesis testing across data sources; g) Advanced filtering capabilities; h) Ability to drill down to raw data; i) Able to see complex patterns of activity through overall view of multiple sources of information; j) Ability to tag particular areas of interest and write notes.

A third visualization is a waterfall summary view. This waterfall visualization links network topology with an analysis view. To integrate these two data type visualizations, the present system and method uses waterfall displays, which are a collection of hybrid histogram status bars that display in a user-configured, collapsed, time interval, the raw net flow data restricted to the IP range displayed or selected in the topology map as in FIG. 4. In addition to showing a summary of the flow variables, the display allows for the overlay of alerts associated with the topology map so that complex attacks can be seen. The waterfall histogram variable bars can be expanded to reveal the scatter plot view, showing the data related to the bar (vertical axis) and the time range of the sample (horizontal axis). This shows the analyst any trends or patterns in the raw data. Some of the attributes of this display are: a) Fusion of many sources (represent large number of relationships across disparate logs); b) Multiple basic histograms with ability to define and customize additional histograms; c) "At a glance" summary of activity; d) Advanced filtering capabilities; e) Ability to drill down to raw data; and f) an Ability to tag particular areas of interest and write notes.

To integrate expert knowledge from the analysts into the visualizations, the present invention has made it possible to associate comments and interpretation to patterns, events or views within the visualizations. For example in the topology based tool, a user can associate a note to the rules and logs so that other individuals viewing the data can see what the analyst thought about a particular node or area of interest. In another example, an analyst may associate a note explaining that a scatter plot pattern overlaid with alert halos shows a pattern where malicious activity has been seen across a particular IP range. These analyst observations and commentary can be integrated in the visualization as a flag icon linked to the relevant data. These notes and flags may aid in seeing low and slow, stealthy campaigns. Such attacks are often difficult to detect and such patterns are not easy see across multiple log files or multiple days. The notes allow for multiple analysts to share information and allow them to make a note of correlations performed in the analysts head.

The present invention fuses multiple data sources together across an enterprise via a topology alert visualization and an analysis window that includes a multitude of variables that are both host based and network based. These include but are not limited to: 1) TCP dump, 2) SNORT alerts, 3) WWW apache logs, 4) FTP logs, 5) sys logs, 6) windows event logs, 7) performance logs, 8) tripwire checksum alerts, and 9) psacct derivative alerts. Additional features that are provided by the present invention such as functionality for user interaction with the interface 100 such as: 1) Zoom in-out, or Drill Down. The visualizations provide the user the ability to drill down for more specific information about a particular range of IP's or alerts including the ability to see the raw data in a popup window. 2) Holistic view. Provides a global view of the host and network based network information based upon a scalable topology map. 3) Scalability. The visualization paradigm is scalable to allow for the input of new sources of information. This is done with a configurable and scalable alert ring that has the ability to add any type of alert from network or physical security alerts. 4) Hypothesis testing. This testing allows the analyst to test different hypotheses by reconfiguring the analysis window with different assignments of a multitude of alerts and variables to different x, y, size, color, and brightness graphic attributes. 5) Custom augmentation. Provide means for analyst to augment the output of the technology with their own insight by allowing them to develop new "flow" visualizations and unique alert configurations. In addition, we provide the ability for the analyst to add notes to nodes and alerts so that slow suspicious activity can be tracked. 6) Support decision making process. Judicially uses visualization components to support the decision making process and the user mental model. 7) Pre-attentive design. Takes advantage of cognitive based pre-attentive graphic principles that ensure visual saliency and reduce information clutter.

Other Applications of Visualization Interface

The use to detect cyber threats is just one use for the visualization interface 100. As has been noted above, the visualization interface 100 has many other applications such as to finance, e-mail management, e-mail service, personal information management, resource project management, and a database interaction.

In one application, the visualization interface 1100 of FIG. 11 is used for e-mail management. In such application, the first portion 1104*a* of parameter space 1104 is used to show a list of persons or their e-mail address or identification that has sent an e-mail to the user. The center of attention 1102 may represent a number of subjects with boxes positioned within the space 1102. The number of e-mail messages on that particular subject determines the size of the boxes in the center of attention 1102. The second portion 1104*b* of the parameter space 1104 contains information related to time, such as a breakdown of a given day or a calendar showing days, weeks, months or years. The third portion 1104*c* of the parameter space 1104 provides a list of names or identification information for recipients of the e-mail messages. Finally, the correlation elements 1106 are connected between the sections 1104*a*, 1104*b*, and 1104*c* of the parameter space 1104 and the e-mail subject in the center of attention 1102. Further additions to the visualization interface 1100 may include areas to present additional content such as advertising in the corners between the portions of the parameter space 1104*a*, 1104*b*, and 1104*c*. Those skilled in the art will understand that a portion of the center of attention 1102 proximate the bottom parameter space 1104 may provide the preview pane for displaying the content of a particular e-mail.

The visualization interface 1100 of FIG. 11 can also be used as an interface for a personal information management system. In such an embodiment, the parameter space 1104 has a four sections, thus providing a section in the parameter space 1104 for 1) information, 2) goals, 3) a From section, and 4) a To section. The parameters of the sections are contacts, files, e-mails and notes/tasks. The center of attention 1102 provides an area in which to provide information about the who, what, where, and when. For example, the center of attention 1102 provides an axis of time with the lower left corner of the center of attention 1102 being the past, the upper right corner of the center of attention 1102 being the future, and the center of the center of attention 1102 being present time. In such an application, the Where is the background of the center of attention 1102, the Who and What are displayed around the perimeter of the center of attention 1102, and the When is along the axis that has just been described. Thus, the users simply need to drag a Who or What into the center of attention 1102 to see what happened or what needs to be done.

In a similar manner as to that which has just been described, the visualization interface 100 of FIG. 11 can be used as an interface for a project management system. The parameter space 1104 again has four sections, thus providing a section in the parameter space 1104 for 1) completed tasks, 2) objectives, 3) task to be completed, and 4) assets (or liabilities). The parameters of the sections are contacts, files, e-mails and notes/tasks. The center of attention 1102 provides an area in which to provide information about the Who, What, Where, and When. Again, the center of attention 1102 provides an axis of time with the lower left corner of the center of attention 1102 being the past, the upper right corner of the center of attention 1102 being the future, and the center of the center of attention 1102 being present time. In such an application, the Where is the background of the center of attention 1102, the Who and What are displayed around the perimeter of the center of attention 1102, and the When is along the axis that has just been described. Thus, the user simply needs to drag a Who or What into the center of attention 1102 to see what happened or what needs to be done.

In yet another embodiment, the visualization interface 1100 can be used for scheduling. In this embodiment, the center of attention 1102 contains a calendar. The parameter space 1104 is positioned about the center of attention and has two sections: one for resources, and one for people. The correlation elements identify relationships between the resources and people and a given appointment or day. Each of the days in the calendar can be shaded so that the intensity of the shading for a given day reflects the total weighted unavailability.

In still another embodiment, the visualization interface 950 of FIG. 9B can be used as the interface to a database. The parameter space 904 is divided into sections representing a plurality of tables that form the database. These tables are graphically depicted as sectors in the parameter space 904. Each of the sectors is further subdivided to reflect the whole table, a row the table, a column of the table, or an individual record of the table. The relationships between the tables and the variables can be shown in the interface 950 by dragging the whole table, a row the table, a column of the table, or an individual record of the table into the center of attention 902. The correlation elements 906 are then updated by the interface 950 to show such relationships.

Figure 18A:
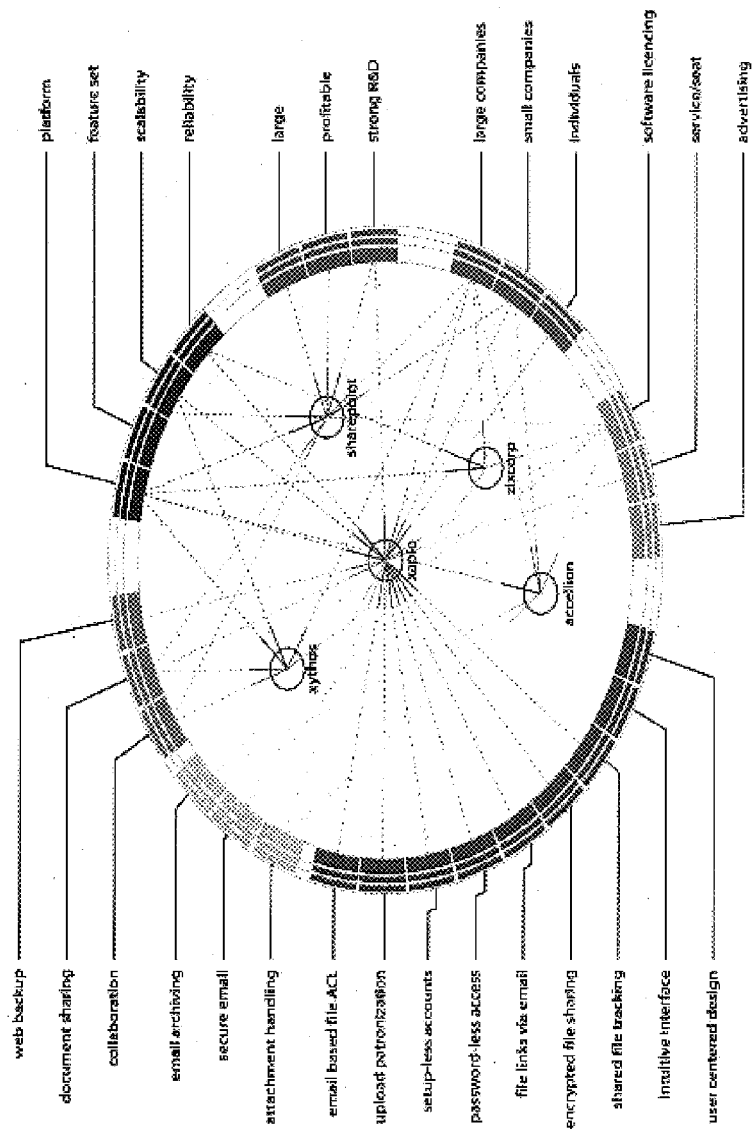
FIGS. 18A and 18B are a graphical representation of an application for first embodiment of the visualization interface of the present invention to competitive business analysis.
Figure 18B:
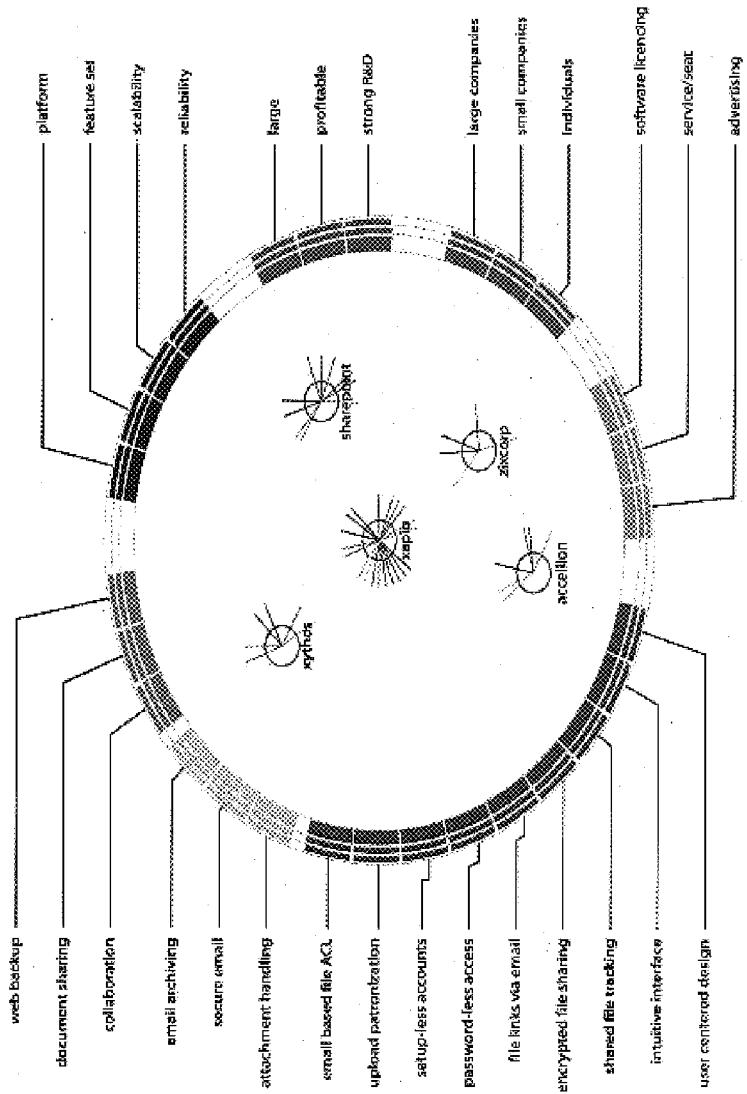

A final example of an application for the visualization interface 1100 is for competitive analysis. In this application, the parameter space 1104 can be used for data about the market features, company strengths, business features, and technology features. The center of interest 1102 provides in an area in which a particular company or product can be represented. The correlation elements 1106 depict relationships between a particular company or product and the other parameters. Examples of application of the user interface are shown in FIGS. 18A and 18B.

Figure 19:
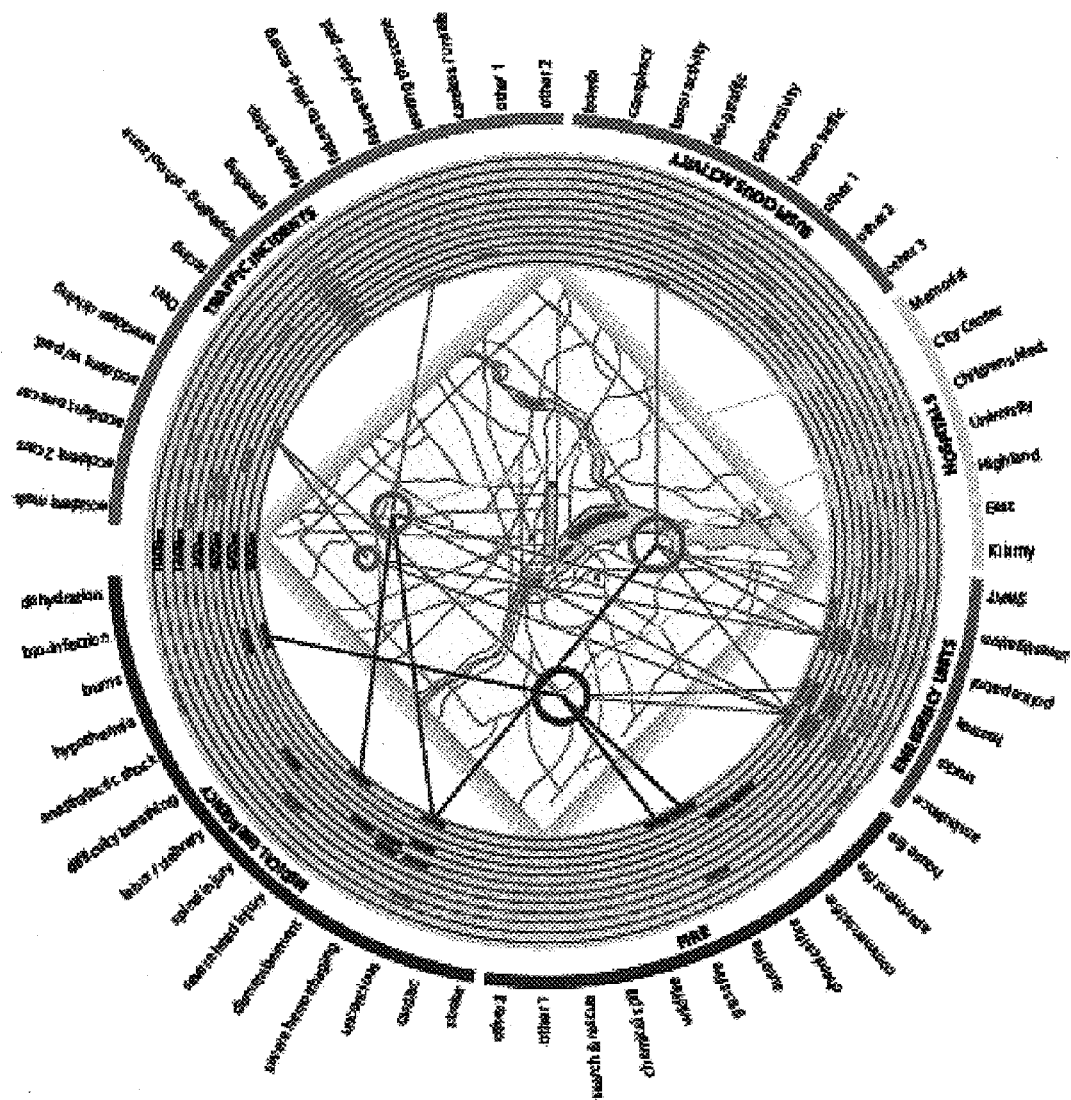
FIG. 19 is a graphical representation of an application for first embodiment of the visualization interface of the present invention to emergency response coordination.
Figure 20:
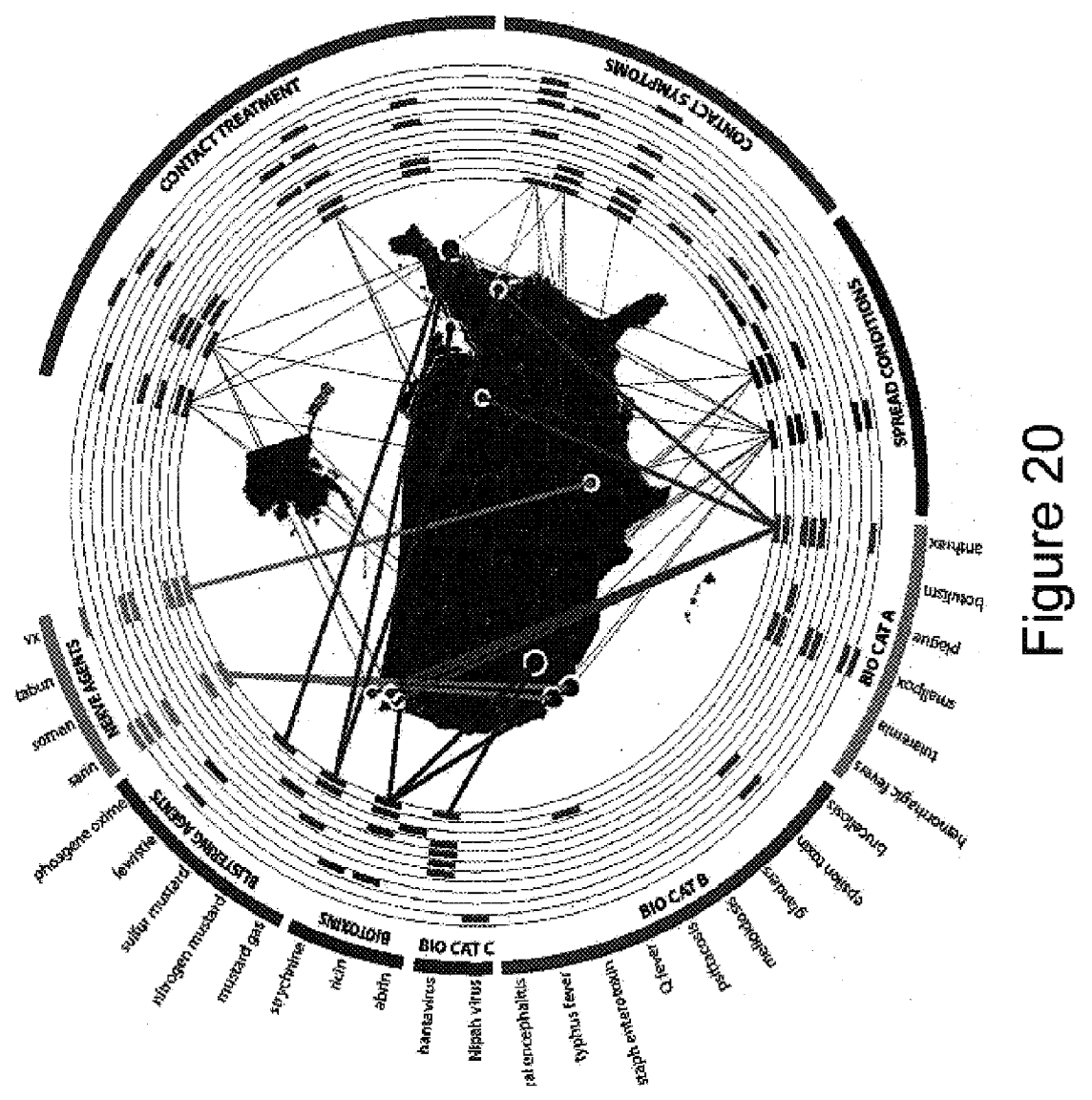

An example of the application of the user interface 900 to emergency response coordination and biological sensor monitoring are shown in FIGS. 19 and 20, respectively.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Of course, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A system for generating a visualization interface comprises:
   a processor,
   a retrieving module executed by the processor having inputs and outputs, configured to retrieve data used to generate the visualization interface, the input of the retrieving module configured to receive data from a data source,
   an analysis module executed by the processor having an input and an output, configured to generate an object, a parameter, a correlation element and a correlation value from received data, where the correlation value is determined by a weighted function, and the correlation value determines a visual attribute for display of the correlation element, the input of the analysis module coupled to the output of the receiving module; and
   a rendering module executed by the processor having an input and an output, configured to generate the visualization interface including a first area, a second area, the object, the parameter and the correlation element, wherein the second area is positioned about the periphery of the first area to make the first area a center of attention, the display of the generated object is augmented responsive to an increase in the correlation between the object and the parameter, and the input of the rendering module is coupled to the output of the analysis module.

2. The system of claim 1 further comprising a control module having inputs and outputs, configured to control the operation the visualization system, the control module coupled to and controlling the retrieving module, the analysis module and the rendering module.

3. The system of claim 2 further comprising an input module having an input and an output, configured to receive and translate input commands from the user into signals usable by the control module, the input of the control module configured to receive input from the user, the output of the input module coupled to the control module.

4. The system of claim 1 wherein the data source is a database table, a database, database server or any numbered collection of data.

5. The system of claim 1 wherein the retrieving module is coupled to a plurality of data sources.

6. The system of claim 1 further comprising an alert module having an input and an output, configured to regenerate the visualization interface in response to an alert signal, the input of the alert module configured to receive the alert signal, the output of the alert module coupled to the retrieving module.

* * * * *